United States Patent
Shafin et al.

(10) Patent No.: US 11,991,629 B2
(45) Date of Patent: May 21, 2024

(54) APPARATUS AND METHOD FOR TWT OPERATION FOR MULTI-LINK DEVICES

(71) Applicant: Samsung Electronics Co., Ltd., Suwon-si (KR)

(72) Inventors: Rubayet Shafin, Allen, TX (US); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 174 days.

(21) Appl. No.: 17/676,645

(22) Filed: Feb. 21, 2022

(65) Prior Publication Data

US 2022/0272630 A1 Aug. 25, 2022

Related U.S. Application Data

(60) Provisional application No. 63/296,742, filed on Jan. 5, 2022, provisional application No. 63/230,571, filed (Continued)

(51) Int. Cl.
*H04W 52/02* (2009.01)
*H04W 76/15* (2018.01)

(52) U.S. Cl.
CPC ... *H04W 52/0216* (2013.01); *H04W 52/0219* (2013.01); *H04W 76/15* (2018.02)

(58) Field of Classification Search
CPC ......... H04W 52/0216; H04W 52/0219; H04W 76/15; Y02D 30/70
See application file for complete search history.

(56) References Cited

U.S. PATENT DOCUMENTS

| 2018/0206174 A1 | 7/2018 | Zhou et al. |
| 2019/0268956 A1 | 8/2019 | Xiao et al. |

(Continued)

FOREIGN PATENT DOCUMENTS

| WO | 2020040587 A1 | 2/2020 |
| WO | 2020246708 A1 | 12/2020 |

OTHER PUBLICATIONS

IEEE Standards Association; IEEE Std. 802.11-2020; IEEE Standard for Information Technology—Telecommunications and Information Exchange between Systems—Local and metropolitan area networks—Specific requirements; "Part 11: Wireless LAN Medium Access Control (MAC) and Physical Layer (PHY) Specifications"; 2020, 4379 pgs.

(Continued)

*Primary Examiner* — Walli Z Butt

(57) ABSTRACT

Embodiments of the present disclosure provide methods and apparatuses for facilitating broadcast target wake time (TWT) operation in a wireless local area network. The apparatuses include a non-access point (AP) multi-link device (MLD) comprising a transceiver and a processor operably coupled to the transceiver. The processor is configured to perform a multi-link (ML) setup operation with an AP MLD to set up links between the STAs affiliated with the non-AP MLD and corresponding APs affiliated with the AP MLD, negotiate a broadcast TWT agreement over a first link between a first STA and a first AP of the AP MLD, wherein the broadcast TWT agreement is for a shared TWT session including a group of the links, and after the broadcast TWT agreement is successfully negotiated, apply the broadcast TWT agreement to the group of links.

20 Claims, 14 Drawing Sheets

Related U.S. Application Data on Aug. 6, 2021, provisional application No. 63/177,244, filed on Apr. 20, 2021, provisional application No. 63/171,389, filed on Apr. 6, 2021, provisional application No. 63/153,774, filed on Feb. 25, 2021.

(56) References Cited

U.S. PATENT DOCUMENTS

| | | | |
|---|---|---|---|
| 2020/0221545 | A1 | 7/2020 | Stacey et al. |
| 2021/0144637 | A1* | 5/2021 | Kwon .................. H04W 80/02 |
| 2021/0329547 | A1 | 10/2021 | Kim et al. |
| 2021/0329721 | A1* | 10/2021 | Kim ...................... H04W 76/15 |
| 2022/0132419 | A1* | 4/2022 | Kwon ............... H04W 52/0216 |
| 2022/0225236 | A1 | 7/2022 | Bang et al. |
| 2023/0082270 | A1* | 3/2023 | Guo ..................... H04W 76/40 370/329 |
| 2023/0171691 | A1* | 6/2023 | Dong ............... H04W 52/0235 370/311 |

OTHER PUBLICATIONS

IEEE Standards Association; IEEE 802.11-2016; IEEE Standard for Information technology—Telecommunications and Information exchange between systems—Local and metropolitan area networks—Specific requirements; Part 11: Wireless LAN Medium Access Control (MAC) and Physical Layer (PHY) Specifications; 2016, 3534 pgs.

IEEE P802.11ax/D8.0; Draft Standard for Information technology—Telecommunications and information exchange between systems Local and metropolitan area networks—Specific requirements; "Part 11: Wireless LAN Medium Access Control (MAC) and Physical Layer (PHY) Specifications"; "Amendment 1: Enhancements for High Efficiency WLAN"; LAN/MAN Standards Committee of the IEEE Computer Society; Oct. 2020; 820 pgs.

Ming Gan, et al.; IEEE 802.11-19/1988-03-00be; "Power Save for Multi-link"; Nov. 11, 2019; 15 pgs.

International Search Report and Written Opinion dated May 31, 2022 regarding International Application No. PCT/KR2022/002680, 6 pages.

Gan et al., "TWT for MLD", IEEE802.11-20/1680-00-00be, Nov. 2020, 7 pages.

Extended European Search Report issued Feb. 14, 2024 regarding Application No. 22760062.4, 12 pages.

Gan et al., "Group addressed frames delivery for MLO follow UP", doc.: IEEE 802.11-20/0902-00-00be, Nov. 2020, 9 pages.

Shafin et al., "MLO: Broadcast TWT for MLDS", doc.: IEEE 802.11-21/0394r0, Mar. 2021, 10 pages.

Shafin et al., "MLO: Broadcast TWT for MLDS", doc.: IEEE 802.11-21/0394r1, Apr. 2021, 14 pages.

* cited by examiner

| NDP Paging Indicator | Responder PM Mode | Negotiation Type | TWT Information Frame Disabled | Wake Duration Unit | MLO Enabled (802) | Reserved |
|---|---|---|---|---|---|---|
| 1 | 1 | 2 | 1 | 1 | 1 | 1 |

Bits

FIG. 8

| NDP Paging Indicator | Responder PM Mode | Negotiation Type | TWT Information Frame Disabled | Wake Duration Unit | Individual TWT MLO Enabled (902) | Broadcast TWT MLO Enabled (904) |
|---|---|---|---|---|---|---|
| 1 | 1 | 2 | 1 | 1 | 1 | 1 |

Bits

| Request Type | Target Wake Time | Nominal Minimum TWT Wake Duration | TWT Wake Interval Mantissa | Broadcast TWT Info | Broadcast TWT Link ID Bitmap | Aligned Schedule Link ID Bitmap |
|---|---|---|---|---|---|---|
| 2 | 2 | 1 | 2 | 2 | 0 or 2 | 0 or 2 |

Octets:

| Request Type | Target Wake Time | Nominal Minimum TWT Wake Duration | TWT Wake Interval Mantissa | Broadcast TWT Info | Restricted TWT Traffic Info (optional) | Broadcast TWT Link ID Bitmap (optional) |
|---|---|---|---|---|---|---|
| 2 | 2 | 1 | 2 | 2 | 0 or 3 | 0 or 2 |

Octets (1302)

FIG. 14

| B0 | B1  B3 | B4 | B5 | B6  B7 | B9  B10 | B14 | B15 |
|---|---|---|---|---|---|---|---|
| TWT Request | TWT Setup Command | Trigger | Last Broadcast Parameter Set | Flow Type | Broadcast TWT Recommendation | TWT Wake Interval Exponent | Broadcast TWT Link ID Bitmap Present |
| 1 | 3 | 1 | 1 | 1 | 3 | 5 | 1 |

Bits (1402)

| 1602 | | | | | |
|---|---|---|---|---|---|
| Request Type | Target Wake Time | Nominal Minimum TWT Wake Duration | TWT Wake Interval Mantissa | Broadcast TWT Info | Restricted TWT Traffic Info (optional) | Broadcast TWT Enhanced Info (optional) |

Octets: 2 | 2 | 1 | 2 | 2 | 0 or 3 | 0 or 3

FIG. 16

| 1702 | |
|---|---|
| Broadcast TWT Link ID Bitmap | Reserved |

Octets: 2 | 1

FIG. 17

| 1802 | | | | | | | |
|---|---|---|---|---|---|---|---|
| TWT Request | TWT Setup Command | Trigger | Last Broadcast Parameter Set | Flow Type | Broadcast TWT Recommendation | TWT Wake Interval Exponent | Reserved Broadcast TWT Enhanced Info Present |
| B0 | B1 B2 B3 | B4 | B5 | B6 | B7 B8 B9 | B10 B11 B12 B13 B14 | B15 |

Bits: 1 | 3 | 1 | 1 | 1 | 3 | 5 | 1

FIG. 18

APPARATUS AND METHOD FOR TWT OPERATION FOR MULTI-LINK DEVICES

CROSS-REFERENCE TO RELATED APPLICATION(S) AND CLAIM OF PRIORITY

This application claims priority under 35 U.S.C. § 119(e) to U.S. Provisional Patent Application No. 63/153,774 filed on Feb. 25, 2021, U.S. Provisional Patent Application No. 63/171,389 filed on Apr. 6, 2021, U.S. Provisional Patent Application No. 63/177,244 filed on Apr. 20, 2021, U.S. Provisional Patent Application No. 63/230,571 filed on Aug. 6, 2021, and U.S. Provisional Patent Application No. 63/296,742 filed on Jan. 5, 2022, which are hereby incorporated by reference in their entirety.

TECHNICAL FIELD

This disclosure relates generally to power management in wireless communications systems. Embodiments of this disclosure relate to methods and apparatuses for facilitating broadcast target wake time operation among stations affiliated with a multi-link device for communications in a wireless local area network communications system.

BACKGROUND

With the standardization process of the next generation IEEE 802.11 wireless local area network (WLAN), i.e., IEEE 802.11ax amendment entering the final stage, the IEEE 802.11ax amendment is drawing attention of the information technology (IT) industry. It newly introduces features for improving peak throughput and efficiency in an environment crowded by many 802.11 devices. Example environments include airports, stadiums, and so on. Wi-Fi alliance (WFA) has already launched the WI-FI 6 certification program for guaranteeing interoperability between certified products implementing IEEE 802.11ax amendment. In the market, device manufacturers are already starting to release WI-FI 6 certified smart mobile devices.

Target Wake Time (TWT) is one of the important features of the IEEE 802.11ax amendment. TWT enables wake time negotiation between an access point (AP) and an associated station (STA) for improving power efficiency. With TWT operation, it suffices for a STA to only wake up at pre-scheduled time negotiated with another STA or AP in the network. In IEEE 802.11ax standards, two types of TWT operation are possible—individual TWT operation and broadcast TWT operation. Individual TWT agreements can be established between two STAs or between a STA and an AP. On the other hand, with broadcast TWT operation, an AP can set up a shared TWT session for a group of STAs.

The negotiated parameters such as the wake interval, wake duration and initial wake time (offset) highly affect latency, throughput as well as power efficiency, which are directly related to QoS (quality of service) or customer experiences. Services with different traffic characteristics will have different TWT parameter configurations for better QoS. Additionally, the TWT configuration should adapt to network and service status variation.

TWT allows the non-AP STAs to wake up at designated time only, and thereby reduce power consumption. Some applications (e.g., cloud gaming, AR glasses) can have periodic burst traffic with very strict latency requirements. In setting up TWT by a non-AP STA, the STA may not have the traffic delay information at the AP (i.e., arrival time of downlink traffic). It may lead to large delay between the DL traffic arrival time and TWT service period (SP) start time. This may severely affect latency-sensitive applications. If the non-AP STA has information on the traffic delay at the AP, it can accordingly adjust its TWT parameters and hence can better support TWT traffic.

Multi-link operation (MLO) is another key feature that is currently being developed by the standards body for next generation extremely high throughput (EHT) WI-FI systems, IEEE 802.11be. The WI-FI devices that support MLO are referred to as multi-link devices (MLDs). With MLO, it is possible for a non-AP MLD to discover, authenticate, associate, and set up multiple links with an AP MLD. Channel access and frame exchange is possible on each link between the AP MLD and non-AP MLD.

SUMMARY

Embodiments of the present disclosure provide methods and apparatuses for facilitating broadcast TWT operation among MLDs in a wireless local area network.

In one embodiment, a non-AP MLD is provided, comprising a transceiver and a processor operably coupled to the transceiver. The transceiver is configured to transmit and receive signals. The processor is configured to perform a multi-link (ML) setup operation with an AP MLD to set up links between the STAs affiliated with the non-AP MLD and corresponding APs affiliated with the AP MLD, negotiate a broadcast TWT agreement over a first link between a first STA and a first AP of the AP MLD, wherein the broadcast TWT agreement is for a shared TWT session including a group of the links, and after the broadcast TWT agreement is successfully negotiated, apply the broadcast TWT agreement to the group of links.

In another embodiment, an AP MLD is provided, comprising a transceiver and a processor operably coupled to the transceiver. The transceiver is configured to transmit and receive signals. The processor is configured to perform an ML setup operation with a non-AP MLD to set up links between the APs affiliated with the AP MLD and corresponding STAs affiliated with the non-AP MLD, negotiate a broadcast TWT agreement over a first link between a first AP and a first STA of the non-AP MLD, wherein the broadcast TWT agreement is for a shared TWT session including a group of the links, and after the broadcast TWT agreement is successfully negotiated, apply the broadcast TWT agreement to the group of links.

In another embodiment, a method performed by a non-AP MLD is provided, including the steps of performing an ML setup operation with an AP MLD to set up links between a plurality of STAs affiliated with the non-AP MLD and corresponding APs affiliated with the AP MLD, negotiating a broadcast TWT agreement over a first link between a first STA and a first AP of the AP MLD, wherein the broadcast TWT agreement is for a shared TWT session including a group of the links, and after the broadcast TWT agreement is successfully negotiated, applying the broadcast TWT agreement to the group of links.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive,"

and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

The following documents and standards descriptions are hereby incorporated into the present disclosure as if fully set forth herein:

[1] IEEE 802.11-19/1988r3, "Power Save for Multi-link", June 2020.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 8 illustrates an example Control field format of a TWT element according to various embodiments of the present disclosure;

FIG. 9 illustrates an example Control field format of a TWT element with separate Individual and Broadcast TWT Enabled bits according to various embodiments of the present disclosure;

FIG. 12 illustrates another example of a Broadcast TWT Parameter Set field format according to various embodiments of the present disclosure;

FIG. 13 illustrates another example of a Broadcast TWT Parameter Set field format according to various embodiments of the present disclosure;

FIG. 14 illustrates another example of a Request Type field format in a Broadcast TWT Parameter Set field according to various embodiments of the present disclosure;

FIG. 16 illustrates another example of a Broadcast TWT Parameter Set field format according to various embodiments of the present disclosure;

FIG. 17 illustrates an example format of a Broadcast TWT Enhanced Info subfield of a Broadcast TWT Parameter Set field according to various embodiments of the present disclosure;

FIG. 18 illustrates an example format of a Request Type field in a Broadcast TWT Parameter Set field according to various embodiments of the present disclosure.

DETAILED DESCRIPTION

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that TWT operation would be desirable for efficient power management for MLDs. Broadcast TWT is a special kind of TWT operation where multiple participating STAs can obtain membership to the same TWT schedule in a shared TWT session. Broadcast TWT operation would facilitate efficient power management for MLDs, however, there is currently no provision for MLDs to support broadcast TWT operation. Therefore, MLDs cannot enjoy all the benefits of broadcast TWT operation, which may potentially lead to overall performance degradation of the system. Hence, it is desirable to develop a technology that supports broadcast TWT operations for MLDs.

Accordingly, embodiments of the present disclosure provide apparatuses and methods that enable MLDs to participate in broadcast TWT operation. These embodiments enable MLDs to indicate, during multi-link (ML) setup, whether they are capable of broadcast TWT operation, and to subsequently negotiate a broadcast TWT agreement between an AP MLD and a non-AP MLD.

Embodiments of the present disclosure further recognize that, when setting up Broadcast TWT schedules between an AP MLD and a non-AP MLD, if the Broadcast TWT schedules were aligned across multiple links, then both the AP MLD and non-AP MLD would potentially be benefitted—for example, the same traffic flow could be directed towards multiple links between the AP MLD and the non-AP MLD. Hence, it would be useful to establish the provision of aligned TWT schedules for broadcast TWT operation for multi-link devices.

Accordingly, embodiments of the present disclosure provide apparatuses and methods that enable a broadcast TWT schedule to be set up between an AP MLD and a non-AP MLD and for the broadcast TWT schedule to be aligned across multiple links between the AP MLD and the non-AP MLD that are participating in a broadcast TWT agreement.

Figure 1:
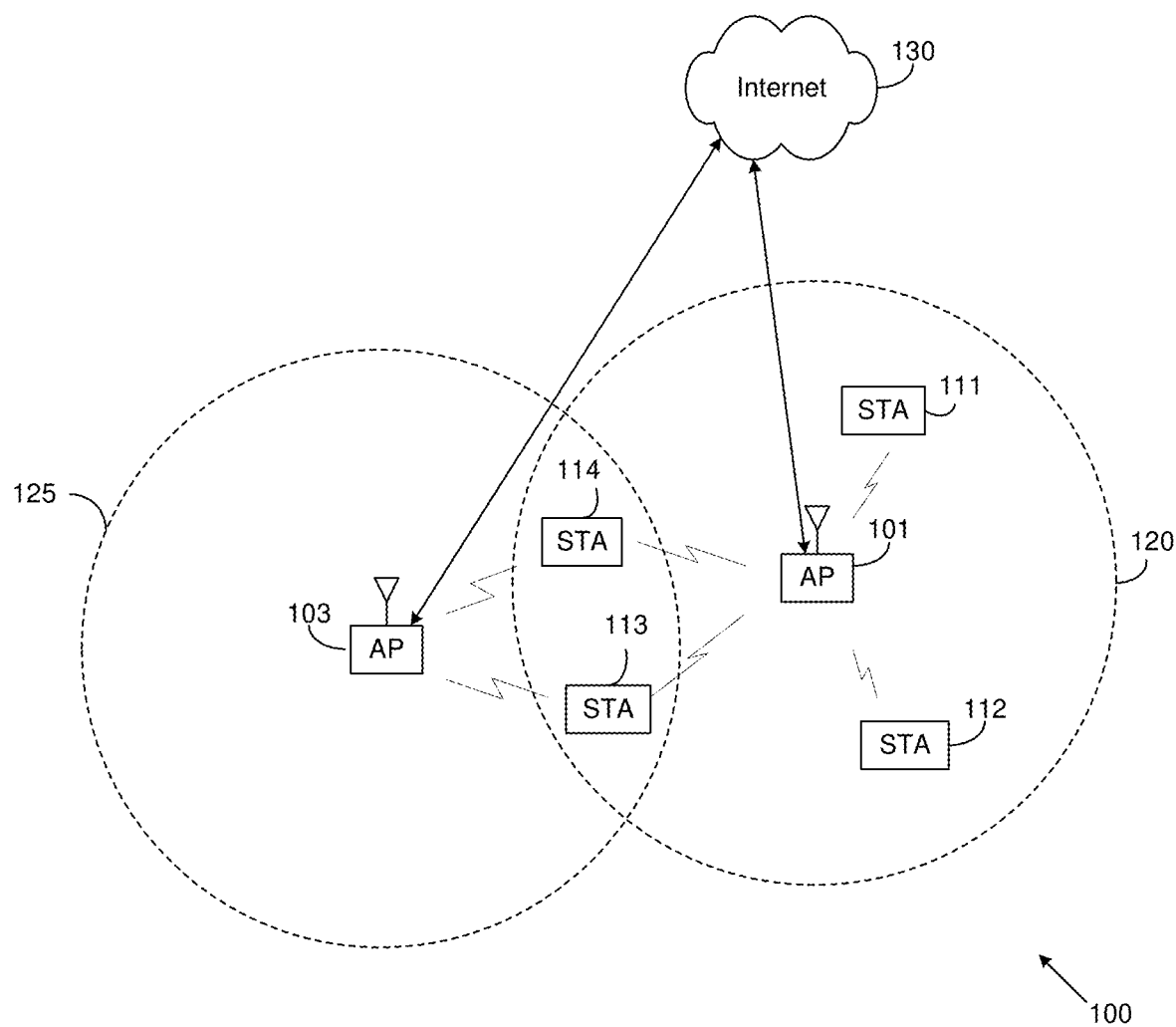
FIG. 1 illustrates an example wireless network according to various embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes APs 101 and 103. The APs 101 and 103 communicate with at least one network 130, such as the Internet, a proprietary Internet Protocol (IP) network, or other data network. The AP 101 provides wireless access to the network 130 for a plurality of STAs 111-114 within a coverage area 120 of the AP 101. The APs 101-103 may communicate with each other and with the STAs 111-114 using Wi-Fi or other WLAN communication techniques.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA (e.g., an AP STA). Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.). This type of STA may also be referred to as a non-AP STA.

In various embodiments of this disclosure, each of the APs 101 and 103 and each of the STAs 111-114 may be an MLD. In such embodiments, APs 101 and 103 may be AP MLDs, and STAs 111-114 may be non-AP MLDs. Each MLD is affiliated with more than one STA. For convenience of explanation, an AP MLD is described herein as affiliated with more than one AP (e.g., more than one AP STA), and a non-AP MLD is described herein as affiliated with more than one STA (e.g., more than one non-AP STA).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for facilitating broadcast TWT operation among MLDs in WLANs. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
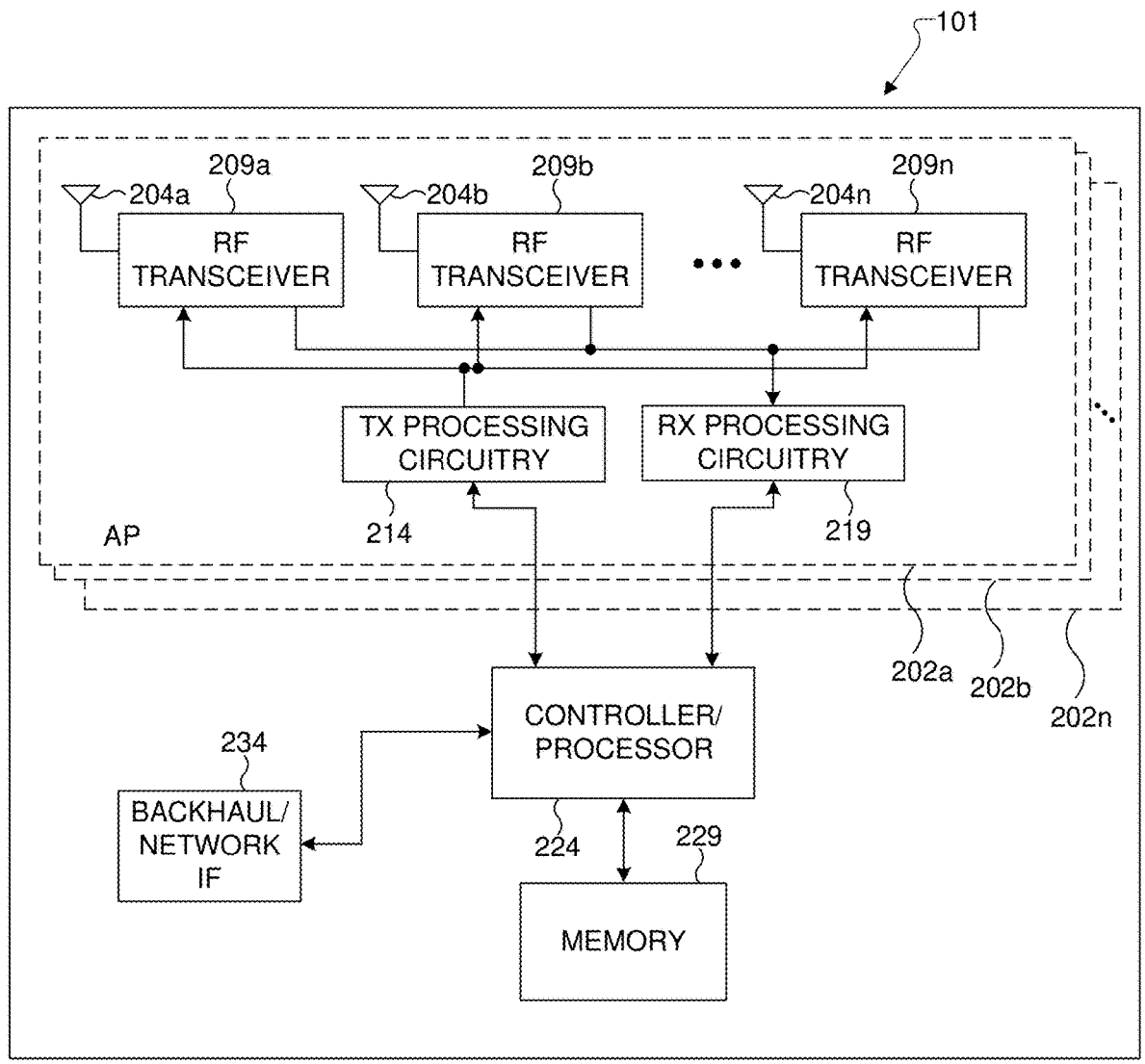
FIG. 2A illustrates an example AP according to various embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. In the embodiments discussed herein below, the AP 101 is an AP MLD. However, APs come in a wide variety of configurations, and FIG. 2A does not limit the scope of this disclosure to any particular implementation of an AP.

The AP MLD 101 is affiliated with multiple APs 202a-202n (which may be referred to, for example, as AP1-APn). Each of the affiliated APs 202a-202n includes multiple antennas 204a-204n, multiple RF transceivers 209a-209n, transmit (TX) processing circuitry 214, and receive (RX) processing circuitry 219. The AP MLD 101 also includes a controller/processor 224, a memory 229, and a backhaul or network interface 234.

The illustrated components of each affiliated AP 202a-202n may represent a physical (PHY) layer and a lower media access control (LMAC) layer in the open systems interconnection (OSI) networking model. In such embodiments, the illustrated components of the AP MLD 101 represent a single upper MAC (UMAC) layer and other higher layers in the OSI model, which are shared by all of the affiliated APs 202a-202n.

For each affiliated AP 202a-202n, the RF transceivers 209a-209n receive, from the antennas 204a-204n, incoming RF signals, such as signals transmitted by STAs in the network 100. In some embodiments, each affiliated AP 202a-202n operates at a different bandwidth, e.g., 2.4 GHz, 5 GHz, or 6 GHz, and accordingly the incoming RF signals received by each affiliated AP may be at a different frequency of RF. The RF transceivers 209a-209n down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

For each affiliated AP 202a-202n, the TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-converts the baseband or IF signals to RF signals that are transmitted via the antennas 204a-204n. In embodiments wherein each affiliated AP 202a-202n operates at a different bandwidth, e.g., 2.4 GHz, 5 GHz, or 6 GHz, the outgoing RF signals transmitted by each affiliated AP may be at a different frequency of RF.

The controller/processor 224 can include one or more processors or other processing devices that control the overall operation of the AP MLD 101. For example, the controller/processor 224 could control the reception of forward channel signals and the transmission of reverse channel signals by the RF transceivers 209a-209n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP MLD 101 by the controller/processor 224 including facilitating broadcast TWT operation among MLDs in WLANs. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP MLD 101 to communicate with other devices or systems over a backhaul connection or over a network. The interface 234 could support communications over any suitable wired or wireless connection(s). For example, the interface 234 could allow the AP MLD 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP MLD 101 may include circuitry and/or programming for facilitating broadcast TWT operation among MLDs in WLANs. Although FIG. 2A illustrates one example of AP MLD 101, various changes may be made to FIG. 2A. For example, the AP MLD 101 could include any number of each component shown in FIG. 2A. As a particular example, an AP MLD 101 could include a number of interfaces 234, and the controller/processor 224 could support routing functions to route data between different network addresses. As another particular example, while each affiliated AP 202a-202n is shown as including a single instance of TX processing circuitry 214 and a single instance of RX processing circuitry 219, the AP MLD 101 could include multiple instances of each (such as one per RF transceiver) in one or more of the affiliated APs 202a-202n. Alternatively, only one antenna and RF transceiver path may be included in one or more of the affiliated APs 202a-202n, such as in legacy APs. Also, various components in FIG. 2A could be combined, further subdivided, or omitted and additional components could be added according to particular needs.

Figure 2B:
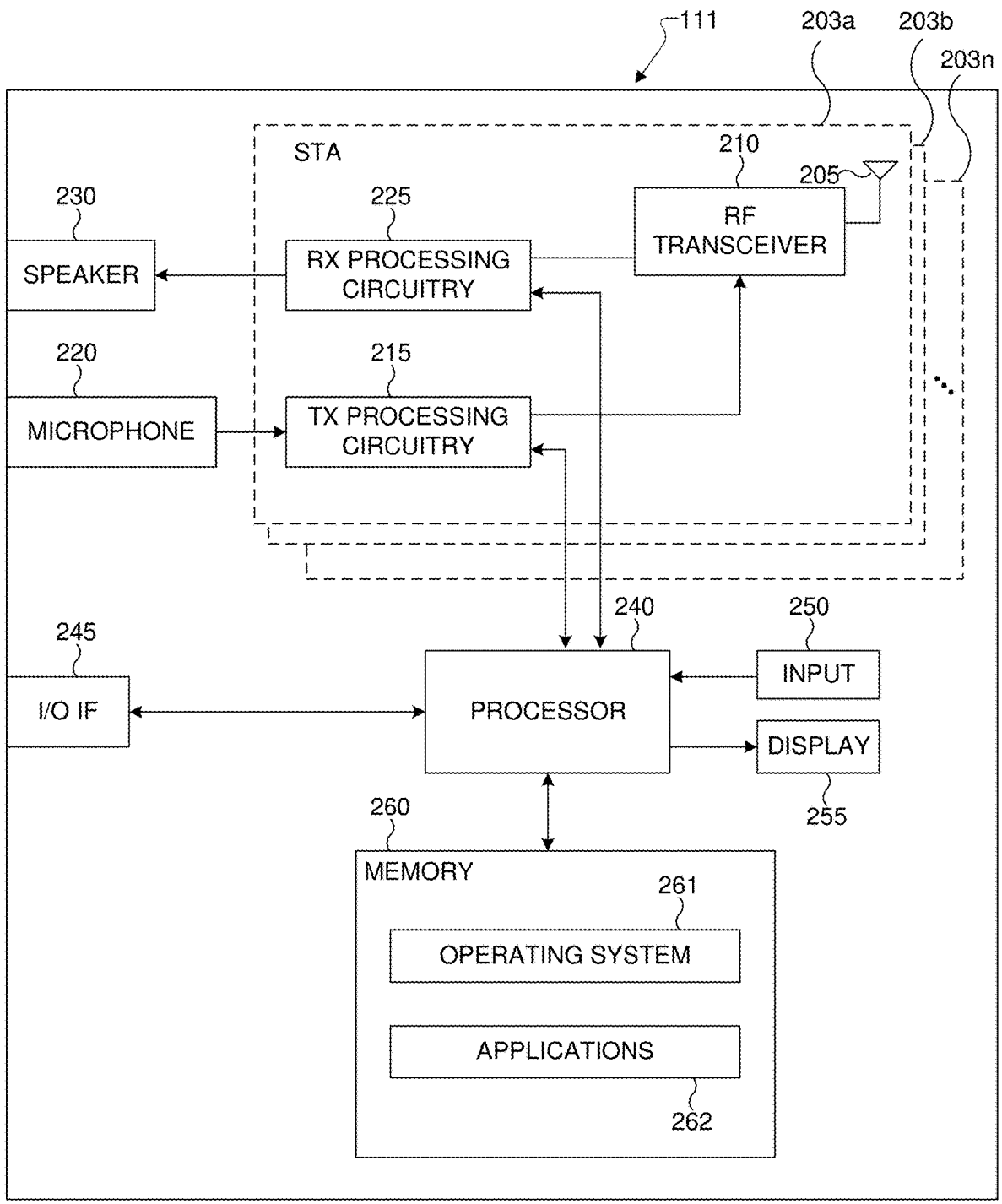
FIG. 2B illustrates an example STA according to various embodiments of this disclosure.

FIG. 2B illustrates an example STA 111 according to various embodiments of this disclosure. The embodiment of the STA 111 illustrated in FIG. 2B is for illustration only, and the STAs 111-115 of FIG. 1 could have the same or similar configuration. In the embodiments discussed herein below, the STA 111 is a non-AP MLD. However, STAs come in a wide variety of configurations, and FIG. 2B does not limit the scope of this disclosure to any particular implementation of a STA.

The non-AP MLD 111 is affiliated with multiple STAs 203a-203n (which may be referred to, for example, as STA1-STAn). Each of the affiliated STAs 203a-203n includes antenna(s) 205, a radio frequency (RF) transceiver 210, TX processing circuitry 215, and receive (RX) processing circuitry 225. The non-AP MLD 111 also includes a microphone 220, a speaker 230, a controller/processor 240, an input/output (I/O) interface (IF) 245, a touchscreen 250, a display 255, and a memory 260. The memory 260 includes an operating system (OS) 261 and one or more applications 262.

The illustrated components of each affiliated STA 203a-203n may represent a PHY layer and an LMAC layer in the OSI networking model. In such embodiments, the illustrated components of the non-AP MLD 111 represent a single UMAC layer and other higher layers in the OSI model, which are shared by all of the affiliated STAs 203a-203n.

For each affiliated STA 203a-203n, the RF transceiver 210 receives, from the antenna(s) 205, an incoming RF signal transmitted by an AP of the network 100. In some embodiments, each affiliated STA 203a-203n operates at a different bandwidth, e.g., 2.4 GHz, 5 GHz, or 6 GHz, and accordingly the incoming RF signals received by each affiliated STA may be at a different frequency of RF. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

For each affiliated STA 203a-203n, the TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205. In embodiments wherein each affiliated STA 203a-203n operates at a different bandwidth, e.g., 2.4 GHz, 5 GHz, or 6 GHz, the outgoing RF signals transmitted by each affiliated STA may be at a different frequency of RF.

The controller/processor 240 can include one or more processors and execute the basic OS program 261 stored in the memory 260 in order to control the overall operation of the non-AP MLD 111. In one such operation, the main controller/processor 240 controls the reception of forward channel signals and the transmission of reverse channel signals by the RF transceiver 210, the RX processing circuitry 225, and the TX processing circuitry 215 in accordance with well-known principles. The main controller/processor 240 can also include processing circuitry configured to provide facilitating broadcast TWT operation among MLDs in WLANs. In some embodiments, the controller/processor 240 includes at least one microprocessor or microcontroller.

The controller/processor 240 is also capable of executing other processes and programs resident in the memory 260, such as operations for facilitating broadcast TWT operation among MLDs in WLANs. The controller/processor 240 can move data into or out of the memory 260 as required by an executing process. In some embodiments, the controller/processor 240 is configured to execute a plurality of applications 262, such as applications for facilitating broadcast TWT operation among MLDs in WLANs. The controller/processor 240 can operate the plurality of applications 262 based on the OS program 261 or in response to a signal received from an AP. The main controller/processor 240 is also coupled to the I/O interface 245, which provides non-AP MLD 111 with the ability to connect to other devices such as laptop computers and handheld computers. The I/O interface 245 is the communication path between these accessories and the main controller 240.

The controller/processor 240 is also coupled to the touch-screen 250 and the display 255. The operator of the non-AP MLD 111 can use the touchscreen 250 to enter data into the non-AP MLD 111. The display 255 may be a liquid crystal display, light emitting diode display, or other display capable of rendering text and/or at least limited graphics, such as from web sites. The memory 260 is coupled to the controller/processor 240. Part of the memory 260 could include a random access memory (RAM), and another part of the memory 260 could include a Flash memory or other read-only memory (ROM).

Although FIG. 2B illustrates one example of non-AP MLD 111, various changes may be made to FIG. 2B. For example, various components in FIG. 2B could be combined, further subdivided, or omitted and additional components could be added according to particular needs. In particular examples, one or more of the affiliated STAs 203a-203n may include any number of antenna(s) 205 for MIMO communication with an AP 101. In another example, the non-AP MLD 111 may not include voice communication or the controller/processor 240 could be divided into multiple processors, such as one or more central processing units (CPUs) and one or more graphics processing units (GPUs). Also, while FIG. 2B illustrates the non-AP MLD 111 configured as a mobile telephone or smartphone, non-AP MLDs can be configured to operate as other types of mobile or stationary devices.

Figure 3:
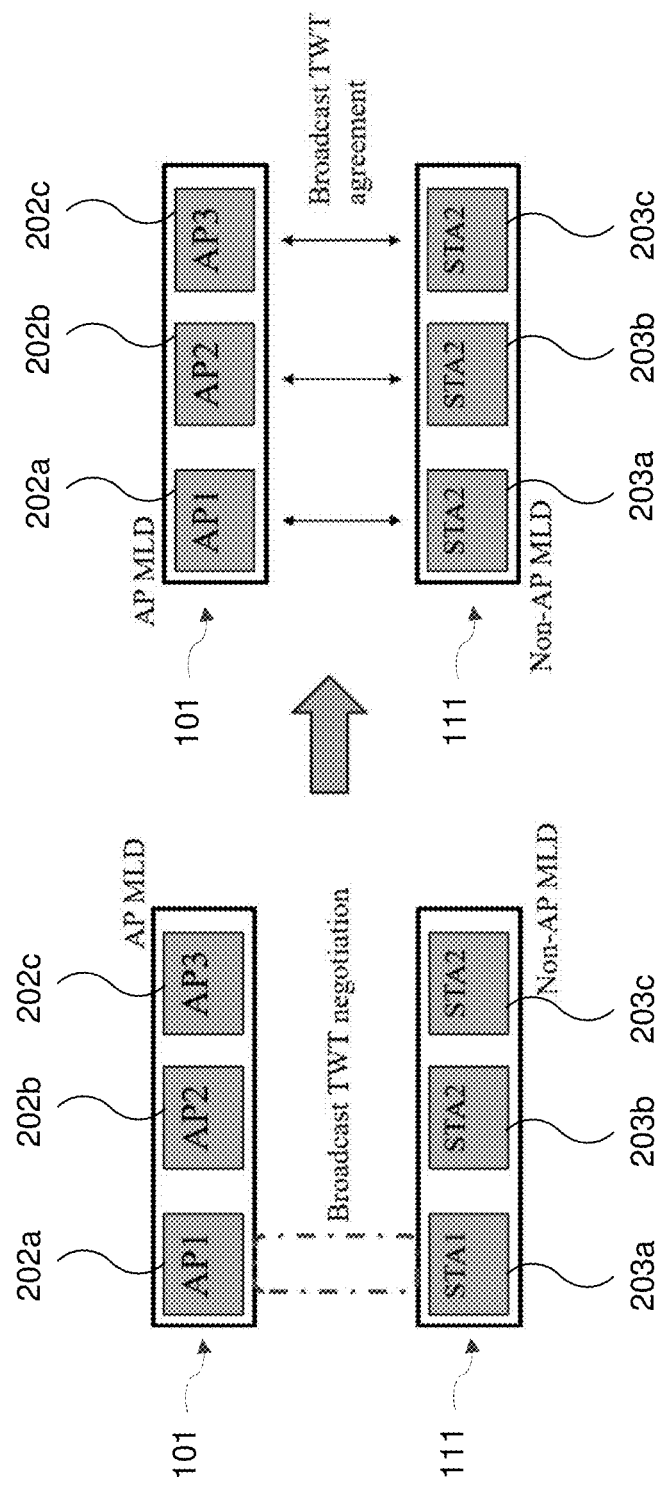
FIG. 3 illustrates an example process of broadcast TWT agreement setup for multiple links between an AP MLD and a non-AP MLD according to embodiments of the present disclosure.

FIG. 3 illustrates an example process of broadcast TWT agreement setup for multiple links between an AP MLD 101 and a non-AP MLD 111 according to embodiments of the present disclosure. For ease of explanation, the AP MLD 101 is illustrated with three affiliated APs and the non-AP MLD 111 is illustrated with three affiliated STAs, but it is understood that this process could be applied with suitable MLDs having any number of affiliated APs or STAs.

In the embodiment of FIG. 3, an ML setup operation has been performed between the AP MLD 101 and non-AP MLD 111, and links have been set up between AP1 and STA1, AP2 and STA2, and AP3 and STA3. Each of these links may operate at a different bandwidth (e.g., 2.4 GHz, 5 GHz, and 6 GHz, respectively).

In some embodiments, the non-AP MLD 111 informs the AP MLD 101 that it is capable of broadcast TWT operation during the ML setup operation. After the ML setup is completed, the AP MLD 101 may indicate to the non-AP MLD 111 that broadcast TWT operation is supported by the AP MLD 101. For example, the AP MLD 101 may transmit a beacon frame to the non-AP MLD 111 on one of the links after ML setup, where the beacon frame includes a broadcast TWT element (or information element), which can include, e.g., broadcast TWT parameters. The non-AP MLD 111 may be configured to recognize this as an indication that the AP MLD 101 supports broadcast TWT operation. The non-AP MLD 111 and AP MLD 101 can then begin negotiation of a broadcast TWT agreement.

To simplify a broadcast TWT agreement setup for multiple links, a STA affiliated with the non-AP MLD 111 may negotiate a broadcast TWT agreement with an AP affiliated with the AP MLD 101 on one setup link (referred to as the negotiating link), and the same broadcast TWT agreement can be applied to other STAs affiliated with the same non-AP MLD 111. The TWT SP for any MLD supporting broadcast TWT operation can be either trigger-based or non-trigger-based.

In the example of FIG. 3, STA1 (STA 203a) affiliated with the non-AP MLD 111 negotiates a broadcast TWT agreement over its link with AP1 (AP 202a). AP1 in this process may be referred to as the "TWT scheduling AP," and STA1 in this process may be referred to as the "TWT scheduled STA." The broadcast TWT agreement is for a shared TWT session that includes the negotiating link between STA1 and AP1 as well as the link between STA2 (STA 203b) and AP2 (AP 202b) and the link between STA3 (STA 203c) and AP3 (AP 202c).

After STA1 and AP1 successfully negotiate the broadcast TWT agreement, the non-AP MLD 111 and AP MLD 101 apply the same agreement to the other two links. Although this example illustrates negotiation of a broadcast TWT agreement for all links that are set up for MLO between non-AP MLD 111 and AP MLD 101, the broadcast TWT agreement may alternatively be negotiated to include a subset of the links rather than all of the links.

In some embodiments, to enable indication of a subset of the links for participation in a broadcast TWT agreement, a Link ID bitmap can be included in a Broadcast TWT Parameter Set field. If a bit in the Link ID bitmap is set to 1, it implies that the broadcast TWT parameters signaled in the Broadcast TWT Parameter Set are applicable to the corresponding link. Otherwise the broadcast TWT parameters signaled in the Broadcast TWT Parameter Set are not applicable to the corresponding link.

In some embodiments, the absence of the Link ID bitmap in the Broadcast TWT Parameter Set field implies that the broadcast TWT parameters signaled in the Broadcast TWT Parameter Set are applicable to the link on which the Broadcast TWT Parameter Set was transmitted, and not the other links.

The presence of the Link ID bitmap in a TWT element format can be indicated by a bit field of the Control field format of the TWT element format. This bit field can be shared with the indication for the type of TWT agreement (individual or broadcast). If the presence of the Link ID bitmap is indicated, and the negotiation type field indicates that the TWT element is for broadcast TWT, then the Link ID bitmap is for a broadcast TWT operation. If the presence of the Link ID bitmap is indicated, and the negotiation type field indicates that the TWT element is for individual TWT, then the Link ID bitmap is for an individual TWT operation.

Figure 4:
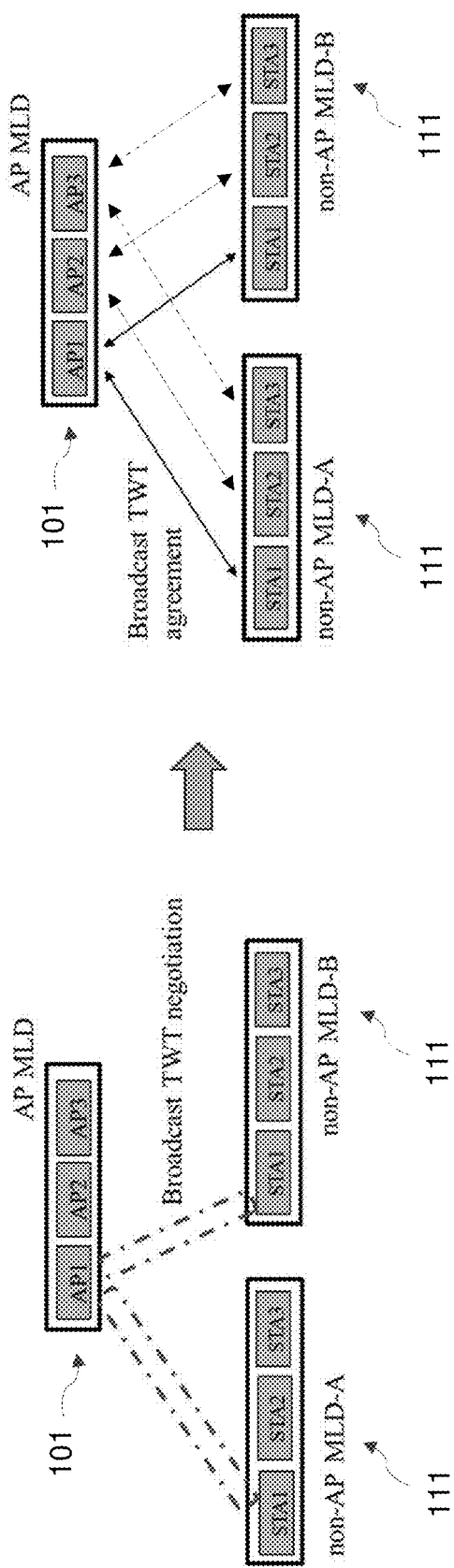
FIG. 4 illustrates an alternative embodiment of an example process of broadcast TWT agreement setup for multiple links between an AP MLD and non-AP MLDs according to embodiments of the present disclosure.

FIG. 4 illustrates an alternative embodiment of an example process of broadcast TWT agreement setup for multiple links between an AP MLD and non-AP MLDs according to embodiments of the present disclosure. This embodiment is similar to that of FIG. 3, with the addition of a second non-AP MLD (non-AP MLD-B). This illustrates that broadcast TWT can be set up between an AP MLD and multiple non-AP MLDs.

In the embodiment of FIG. 4, three links are set up between the AP MLD and non-AP MLD-A. Also, three links are set up between the AP MLD and non-AP MLD-B. Each of the AP MLD and the non-AP MLDs supports broadcast TWT operation. A broadcast TWT negotiation takes place between AP1 of the AP MLD and STA1 of the non-AP MLD-A. Similarly, another broadcast TWT negotiation takes place between AP1 of the AP MLD and STA1 of the non-AP MLD-B. After successful negotiation, the same broadcast TWT schedule is established between AP1 of the AP MLD and STA1 of the non-AP MLD-A, and between AP1 of the AP MLD and STA1 of the non-AP MLD-B.

Figure 5A:
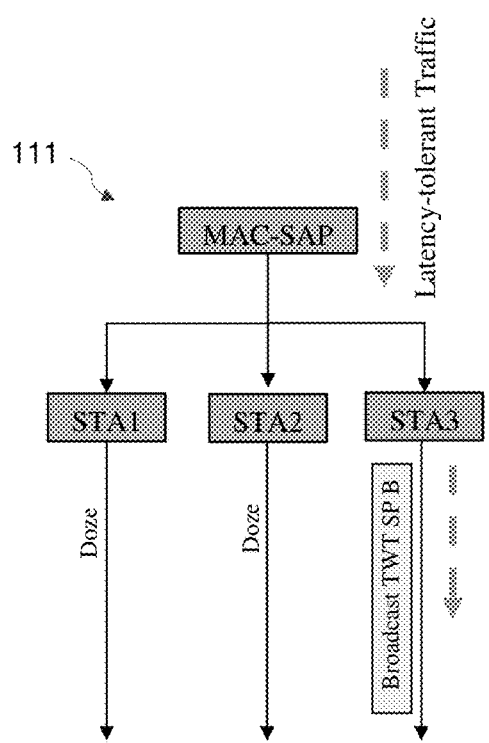
FIGS. 5A and 5B illustrate examples of traffic timing across multiple links of a non-AP MLD in broadcast TWT operation according to various embodiments of the present disclosure.
Figure 5B:
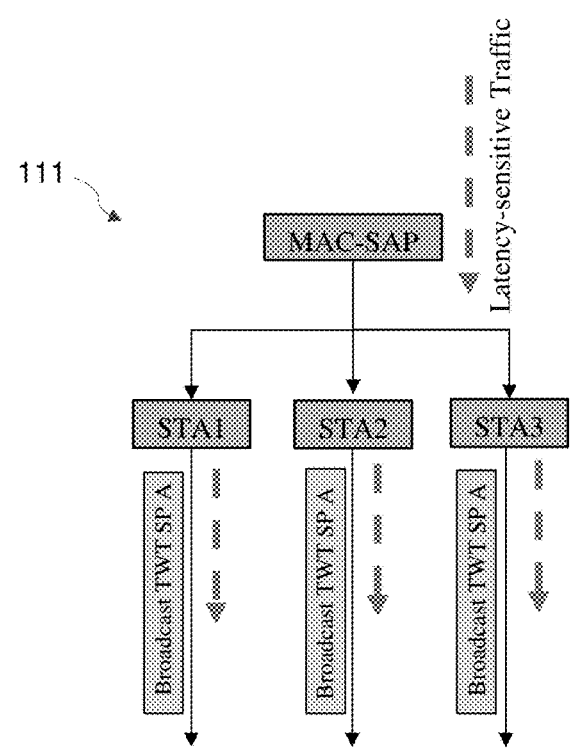

FIGS. 5A and 5B illustrate examples of traffic timing across multiple links of a non-AP MLD in broadcast TWT operation according to various embodiments of the present disclosure. For convenience, the illustrated non-AP MLD is assumed to be a non-AP MLD 111 that has set up MLO and negotiated a broadcast TWT agreement with an AP 101 as illustrated in FIG. 3 or FIG. 4. Accordingly, the illustrated links to STA1, STA2, and STA3 connect to AP1, AP2, and AP3, respectively, although they are not illustrated.

In the embodiment of FIG. 5A, arriving traffic at the non-AP MLD 111 is latency-tolerant. In this example, a broadcast TWT schedule that is configured for the link at STA3 indicates that a start time of a TWT SP is about to arrive (Broadcast TWT SP B). The broadcast TWT schedules that are configured for the other links (at STA1 and STA2), however, do not have available broadcast TWT SPs (i.e., they are in TWT doze state). Accordingly there is only one ML link available for use to transmit the incoming traffic, which is assumed to have an access probability p. Since the traffic is latency-tolerant, however, this may be acceptable.

In the embodiment of FIG. 5B, the arriving traffic is latency-sensitive. For latency-sensitive traffic, it would be desirable to increase the channel access probability as much as possible and reduce channel contention as much as possible. If the STAs affiliated with the non-AP MLD are scheduled to wake up at the same time (i.e., scheduled to have a broadcast TWT SP begin at the same time), then the traffic corresponding to a latency-sensitive traffic identifier (TID) can potentially flow over all the enabled links, thus increasing access opportunities and decreasing contention.

As illustrated in FIG. 5B, the broadcast TWT schedules for all of the enabled links are aligned, and a broadcast TWT SP is scheduled to start at the same time across all links (Broadcast TWT SP A). The access probability across the combined links becomes $1-(1-p)^3 \geq p$, improving the probability that the latency-sensitive TID will successfully transmit. In order to configure this schedule, the AP MLD can align the wake time for the broadcast TWT schedule corresponding to Broadcast TWT SP B across multiple (or all) enabled links based on timing synchronization function (TSF) values for the links. As a result, the end time of the Broadcast TWT SP B will be the same across the multiple enabled links as well.

In a broadcast TWT announcement, the AP MLD may indicate that a broadcast TWT schedule (corresponding to an announced Broadcast TWT Parameter Set) is aligned across multiple links. Such a schedule is referred to herein as an aligned schedule, or an aligned broadcast TWT schedule. The non-AP MLD receiving this broadcast TWT announcement can then choose to become a member of that aligned schedule for frame exchange for latency-sensitive traffic flows. In a similar way, when the non-AP MLD requests, suggests, or demands a broadcast TWT schedule for any link, it can also indicate whether or not it wants the requested, suggested, or demanded broadcast TWT schedules to be aligned across multiple setup links. The aligned schedule can be applied to any subset of enabled links between the AP MLD and non-AP MLD.

Whether or not a particular broadcast TWT schedule is an Aligned Schedule can be indicated by a signaling bit in a Broadcast TWT Parameter Set. For example, if the bit is set to 1, it indicates that the schedule corresponding to the Broadcast TWT Parameter Set is an Aligned Schedule. Otherwise, the schedule corresponding to the Broadcast TWT Parameter Set is not an Aligned Schedule. Either the AP MLD or the non-AP MLD can indicate whether a schedule is an Aligned Schedule or not through the signaling bit in the TWT element it transmits.

In one embodiment, whenever there is a membership of an Aligned Schedule over any link between the AP MLD and non-AP MLD, the Aligned Schedule is applicable to all other enabled links between the AP MLD and non-AP MLD.

In another embodiment, the Aligned Scheduled is applicable to a subset of links between the AP MLD and non-AP MLD. In order to enable the indication of the links that the Aligned Schedule shall be applied to, a Link ID bitmap for Aligned Schedule can be included in a field of the corresponding Broadcast TWT Parameter Set. If a bit in the Link ID bitmap for Aligned Schedule is set to 1, it implies that the Aligned Schedule is applicable to the corresponding link. Otherwise, the Aligned Schedule is not applicable to the corresponding link. The Link ID bitmap can be included in the TWT element transmitted by the AP MLD to indicate, e.g., Accept TWT, Alternate TWT, or Dictate TWT. Alternatively, the Link ID bitmap can be included in the TWT element transmitted by the non-AP MLD to indicate, e.g., Request TWT, Demand TWT, or Suggest TWT.

In another embodiment, if the broadcast TWT schedule is an Aligned Schedule indicated by the Aligned Schedule signaling bit or through some other signaling mechanism, the absence of a Link ID bitmap for Aligned Schedule in the Broadcast TWT Parameter Set in the TWT element transmitted from either the AP MLD or the non-AP MLD implies that the Aligned Schedule is applicable to all enabled links between the AP MLD and non-AP MLD.

In one embodiment, if an Aligned Schedule is present in the Broadcast TWT element sent in a Beacon frame from the AP MLD to the non-AP MLD on any link between the AP MLD and non-AP MLD, and the AP MLD establishes the Aligned Schedule over that link between the AP MLD and non-AP MLD, the same Aligned Schedule is also established on other links between the AP MLD and non-AP MLD regardless of whether the Broadcast TWT element in the Beacon frames sent on the other links contain the same Aligned Schedule (the corresponding Broadcast TWT Parameter Set) or not, and regardless of whether the Beacon frames sent on the other links contain any Broadcast TWT element or not.

In an alternative embodiment wherein an Aligned Schedule is present in the Broadcast TWT element sent in the Beacon frame from the AP MLD to the non-AP MLD on any link between the AP MLD and non-AP MLD, and the AP MLD establishes the Aligned Schedule over that link, the same Aligned Schedule is only established for other links for which the same Aligned Schedule (the corresponding Broadcast TWT Parameter Set) is contained in the Broadcast TWT element in the Beacon frames sent from the AP MLD to the non-AP MLD on those links.

Figure 6:
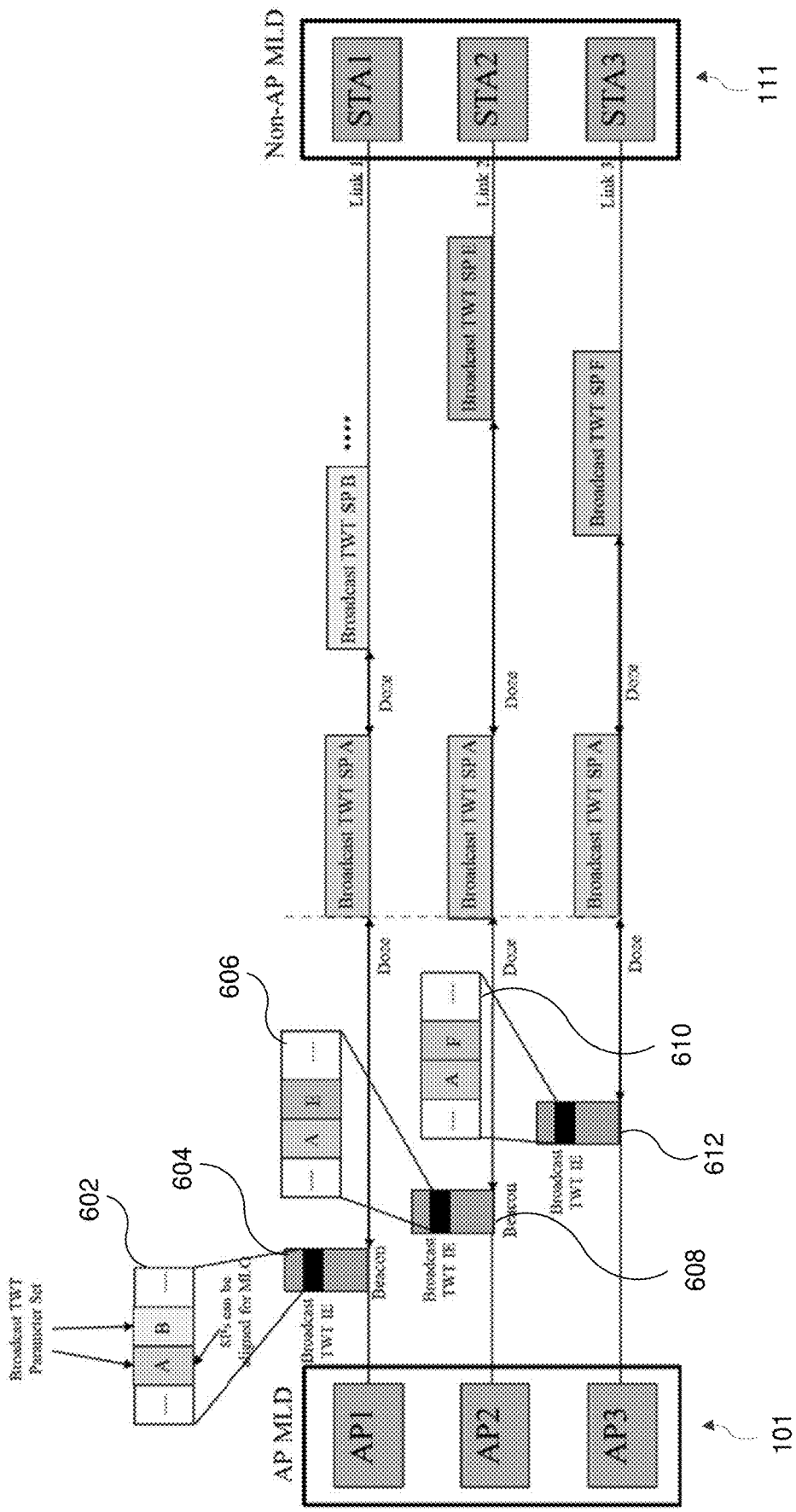
FIG. 6 illustrates an example of aligned schedule signaling by an AP MLD (a TWT scheduling AP MLD) to a non-AP MLD (a TWT scheduled non-AP MLD) according to various embodiments of the present disclosure.

FIG. 6 illustrates an example of aligned schedule signaling by an AP MLD (a TWT scheduling AP MLD) to a non-AP MLD (a TWT scheduled non-AP MLD) according to various embodiments of the present disclosure. In this example, three links are set up between the AP MLD and non-AP MLD (Link 1 between AP1 and STA1, Link 2 between AP2 and STA2, and Link3 between AP3 and STA3). Both the AP MLD and non-AP MLD support Broadcast TWT operation, and a broadcast TWT agreement has been established between them with all three links participating.

The TWT scheduling AP MLD announces the existence of two Broadcast TWT Parameter Sets (Broadcast TWT Parameter Set A and Broadcast TWT Parameter Set B) in the Broadcast TWT IE 602 transmitted in the Beacon frame 604 to the non-AP MLD over Link 1. The AP MLD indicates Accept TWT in the TWT Setup Command field and also indicates that the broadcast TWT schedule corresponding to Broadcast TWT Parameter Set A is an Aligned Schedule.

Another Broadcast TWT IE 606 is included in the Beacon frame 608 transmitted from AP2 to STA2 over Link 2. This IE includes the Broadcast TWT Parameter Set A and Broadcast TWT Parameter Set E. In another Beacon frame 612 transmitted from AP3 to STA3 over Link 3, a Broadcast TWT IE 610 is included with Broadcast TWT Parameter Set A and Broadcast TWT Parameter Set F. In this example, the Link ID bitmap for Aligned Schedule corresponding to Broadcast TWT Parameter Set A is absent in all of the Broadcast TWT Parameter Sets.

The TWT scheduling AP MLD in this way sets up an Aligned Schedule corresponding to Broadcast TWT Parameter Set A across all three links between the AP MLD and non-AP MLD. Furthermore, three other broadcast TWT schedules are set up over the three links: a TWT schedule corresponding to Broadcast TWT Parameter Set B is set up on Link 1, a TWT schedule corresponding to Broadcast TWT Parameter Set E is set up on Link 2, and a TWT schedule corresponding to Broadcast TWT Parameter Set F is set up on Link 3.

Figure 7:
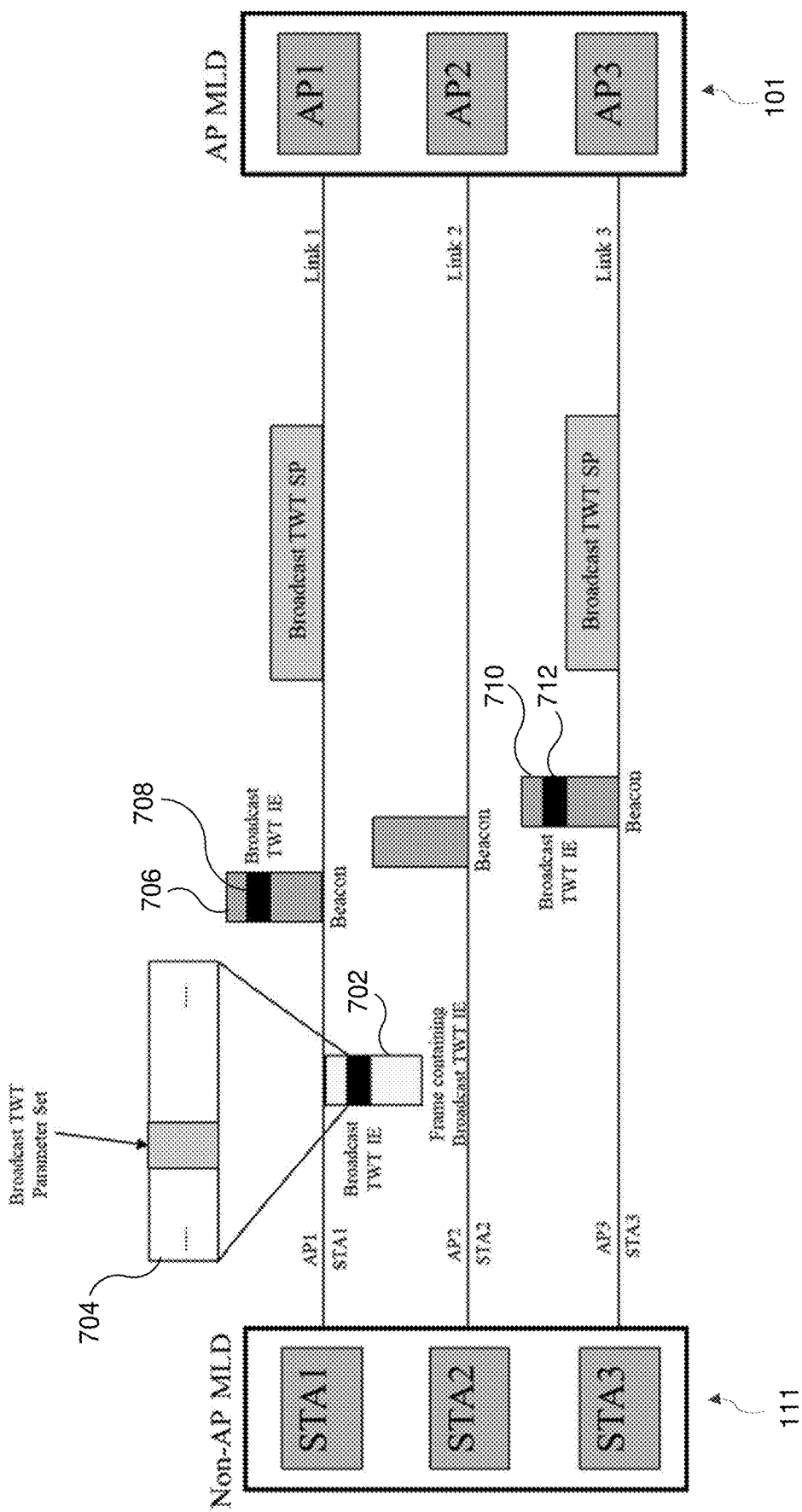
FIG. 7 illustrates an example of aligned schedule signaling by a non-AP MLD to an AP MLD according to various embodiments of the present disclosure.

FIG. 7 illustrates an example of aligned schedule signaling by a non-AP MLD to an AP MLD according to various embodiments of the present disclosure. In this example, similar to the example of FIG. 6, three links are set up between the AP MLD and non-AP MLD (Link 1 between AP1 and STA1, Link 2 between AP2 and STA2, and Link3 between AP3 and STA3). Both the AP MLD and non-AP MLD support broadcast TWT operation, and a broadcast TWT agreement has been established between them with all three links participating.

The non-AP MLD transmits to the AP MLD a TWT initiating frame 702 on Link 1 containing a Broadcast TWT element 704, and suggests a particular broadcast TWT schedule included in the Broadcast TWT element 704 by setting the TWT Setup Command field to Suggest TWT. Moreover, the non-AP MLD indicates to the AP MLD that it wants that broadcast TWT schedule to be an Aligned Schedule. The Broadcast TWT element 704 also contains a Link ID bitmap for Aligned Schedule in the Broadcast TWT Parameter Set, which indicates in this example that the non-AP MLD wants the Aligned Schedule to be set up on Link 1 and Link 3 (but not Link 2).

The AP MLD responds to the non-AP MLD's suggestion with acceptance. The AP MLD creates a broadcast TWT schedule with the same Broadcast TWT Parameter Set contained in the Broadcast TWT IE 704 in the TWT initiating frame 702 transmitted by the non-AP MLD. The AP MLD then transmits to the non-AP MLD over Link 1 and Link 3 Beacon frames 706 and 710, respectively, including Broadcast TWT IEs 708 and 712, respectively, that contain that Broadcast TWT Parameter Set and indicate Accept TWT in the respective TWT Setup Command field. The AP MLD also indicates that the corresponding schedule across Link 1 and Link 3 is the Aligned Schedule. The Broadcast TWT Aligned Schedule is thereby set up across Link 1 and Link 3.

FIG. 8 illustrates an example Control field format of a TWT element according to various embodiments of the present disclosure. For broadcast TWT operation between an AP MLD and a non-AP MLD, an MLO Enabled bit 802 may be present in the Control field of the Broadcast TWT element that is sent over the negotiating link either from the AP MLD (Accept TWT, Alternate TWT, or Dictate TWT) or from the non-AP MLD (Request TWT, Suggest TWT, or Demand TWT), and can be used to indicate that broadcast TWT schedules corresponding to all Broadcast TWT Parameter Sets present in that Broadcast TWT element are applicable to the enabled links between the AP MLD and the non-AP MLD. If the MLO Enabled bit is 1, then all schedules are applicable to all enabled links. If the MLO Enabled bit is 0, then the schedules are not applicable to all enabled links.

For Individual TWT operation, however, there is only one TWT Parameter Set present in the TWT element. For Individual TWT operation for MLDs, the presence of the MLO Enabled bit 802 may be interpreted as an indication of whether or not a TWT negotiation corresponding to the TWT Parameter Set is applicable to all enabled links between the AP MLD and the non-AP MLD. If the bit is 1, then a TWT agreement resulting from the negotiation is applicable to all enabled links. If the bit is 0, then the TWT agreement is not applicable to all enabled links.

In other embodiments, the above-mentioned functionalities of the MLO Enabled bit 802 may be achieved using different bits for individual TWT and broadcast TWT operations. FIG. 9 illustrates an example Control field format of a TWT element with separate Individual and Broadcast TWT Enabled bits according to various embodiments of the present disclosure.

In the example of FIG. 9, for Individual TWT operation, an Individual TWT MLO Enabled bit 902 may be present, and can be used to indicate whether or not a TWT negotiation corresponding to the TWT Parameter Set is applicable to all enabled links between the AP MLD and the non-AP MLD. If the Individual TWT MLO Enabled bit 902 is 1, then a TWT agreement resulting from the negotiation is applicable to all enabled links. If the Individual TWT MLO Enabled bit 902 is 0, then the TWT agreement is not applicable to all enabled links.

For broadcast TWT operation, the Individual TWT MLO Enabled subfield 902 is not present. Instead, for broadcast TWT operation a Broadcast TWT MLO Enabled bit 904 may be present, and can be used to indicate whether or not the Broadcast TWT schedules corresponding to all Broadcast TWT Parameter Sets present in that TWT element are applicable to all enabled links between the AP MLD and the non-AP MLD. If the Broadcast TWT MLO Enabled bit 904 is 1, then all TWT schedules are applicable to all enabled links. If the Broadcast TWT MLO Enabled bit 904 is 0, then TWT schedules are not applicable to all enabled links. For Individual TWT operation, the Broadcast TWT MLO Enabled subfield is not present.

In the embodiments of FIGS. 8 and 9, either the AP MLD or the non-AP MLD can make this indication through the Broadcast TWT Parameter Set in the corresponding Broadcast TWT element. For example, the AP MLD may indicate it with an Accept TWT, Alternate TWT, or Dictate TWT, and the non-AP MLD may indicate it with a Request TWT, Suggest TWT, or Demand TWT.

Figure 10:
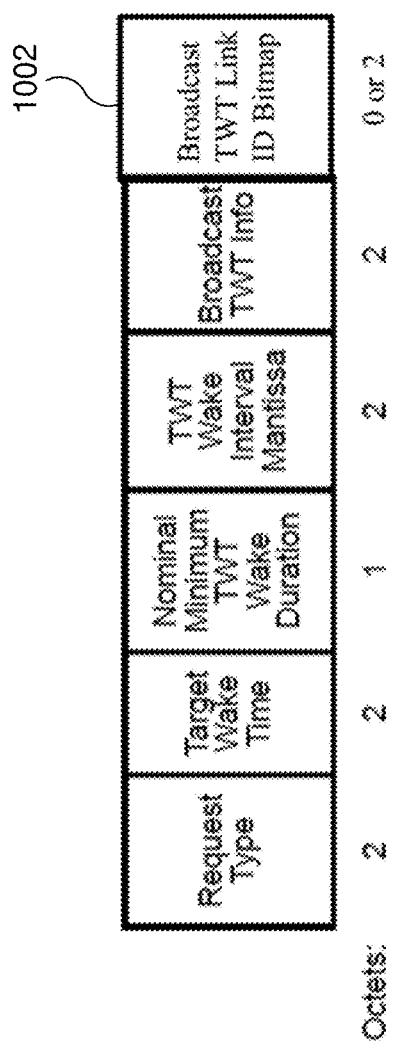
FIG. 10 illustrates an example of a Broadcast TWT Parameter Set field format according to various embodiments of the present disclosure.

FIG. 10 illustrates an example of a Broadcast TWT Parameter Set field format according to various embodiments of the present disclosure. As discussed above, in some embodiments for multi-link operation, the broadcast TWT negotiating link between the AP MLD and the non-AP MLD may also set up the broadcast TWT schedules for other links between the AP MLD and the non-AP MLD. This functionality can be helpful in situations where the other links do not have any Beacon frame or any other frame that contains TWT elements.

In this scenario, any Broadcast TWT Parameter Set may be applicable to any subset of links between the AP MLD and the non-AP MLD. In this case, the MLO Enabled bit in the Control field shall be set to 0, and as illustrated in the example Broadcast TWT Parameter Set field format of FIG. 10, a Broadcast TWT Link ID Bitmap 1002 in the Broadcast TWT Parameter Set may indicate the links for which the schedule corresponding to the Broadcast TWT Parameter Set is applicable. If the bit corresponding to a link in the Broadcast TWT Link ID Bitmap is 1, then the broadcast TWT schedule is applicable to that link. If the bit corresponding to the link in the Broadcast TWT Link ID Bitmap is 0, then the broadcast TWT schedule is not applicable to that link.

In this embodiment, either the AP MLD or the non-AP MLD can indicate this Broadcast TWT Link ID Bitmap through the Broadcast TWT Parameter Set in the corresponding Broadcast TWT element. For example, the AP MLD may indicate it with an Accept TWT, Alternate TWT, or Dictate TWT, and the non-AP MLD may indicate it with a Request TWT, Suggest TWT, or Demand TWT.

In other embodiments, each link between the AP MLD and the non-AP MLD may have its own Broadcast TWT element contained in a Beacon frame, Association Response frame, or Re-Association Response frame, and the broadcast TWT schedules on that link follow the Broadcast TWT Parameter Set included in the Broadcast TWT element sent over that link—either from the AP MLD (with Accept TWT, Alternate TWT, or Dictate TWT) or from the non-AP MLD (with Request TWT, Suggest TWT, or Demand TWT)—regardless of any other indication made through the presence of the MLO Enabled subfield, Broadcast TWT MLO Enabled subfield, or Broadcast TWT Link ID Bitmap field. If either the STA or AP does not support multi-link operation or if the AP or the STA is not affiliated with any multi-link device, then the Broadcast TWT Parameter Set in the TWT element transmitted by either the AP or the STA does not contain a Broadcast TWT Link ID Bitmap field.

If any Broadcast TWT Parameter Set corresponds to an Aligned Schedule, the TWT Wake Time and the Broadcast TWT Persistence parameter for other links follows that of the negotiation link. For Aligned Schedules, the non-AP STAs on other links shall wake up at the same time the non-AP STA on the negotiating link wakes up regardless of the TSF timer values in the other links. Furthermore, if the Broadcast TWT Parameter Set corresponds to an Aligned Schedule, the evolution of a Broadcast TWT Persistence Parameter subfield on the other links follows the evolution on the negotiating link.

Figure 11:
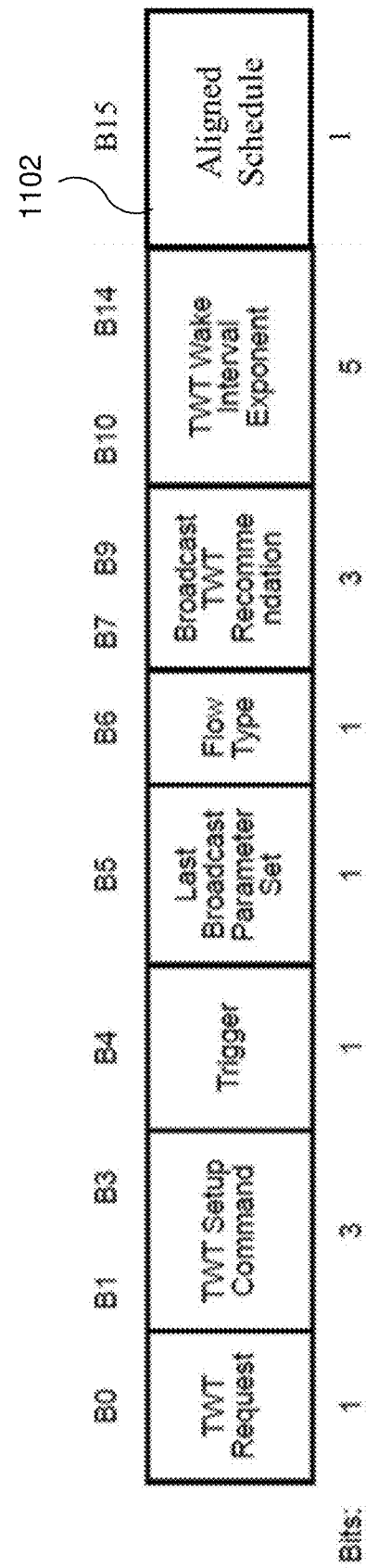
FIG. 11 illustrates an example of a Request Type field format in a Broadcast TWT Parameter Set field according to various embodiments of the present disclosure.

FIG. 11 illustrates an example of a Request Type field format in a Broadcast TWT Parameter Set field according to various embodiments of the present disclosure. As discussed above, whether or not a schedule corresponding to a Broadcast TWT Parameter Set is an Aligned Schedule can be indicated by the Aligned Schedule subfield 1102 in the Request Type field in a Broadcast TWT Parameter Set field, as illustrated in the example Request Type field format of FIG. 11. For multi-link devices, if the bit corresponding to the Aligned Schedule subfield 1102 is 1, then the schedule corresponding to the Broadcast TWT Parameter Set is an Aligned Schedule. If the bit corresponding to the Aligned Schedule subfield 1102 is 0, then the schedule corresponding to the Broadcast TWT Parameter Set is not an Aligned Schedule. If the AP or the non-AP STA does not support Aligned Schedule, or if the AP or non-AP STA is not part of any multi-link devices, then the Aligned Schedule subfield 1102 in the Request Type field format in a Broadcast TWT Parameter Set field shall not be present.

In such embodiments, either the AP MLD or the non-AP MLD can indicate an Aligned Schedule through the Broadcast TWT Parameter Set in the corresponding Broadcast TWT element. For example, the AP MLD may indicate it with an Accept TWT, Alternate TWT, or Dictate TWT, and the non-AP MLD may indicate it with a Request TWT, Suggest TWT, or Demand TWT.

FIG. 12 illustrates another example of a Broadcast TWT Parameter Set field format according to various embodiments of the present disclosure. In some embodiments, as discussed above, whether or not an Aligned Schedule is applicable for more than one link between the AP MLD and the non-AP MLD can be indicated by the presence of an Aligned Schedule Link ID Bitmap field 1202 in the Broadcast TWT Parameter Set, as illustrated in the example Broadcast TWT Parameter Set field format of FIG. 12. If a bit corresponding to a link in the Aligned Schedule Link ID Bitmap is 1, the Aligned Schedule is applicable to that link. If the bit corresponding to the link in the Aligned Schedule Link ID Bitmap is 0, then the Aligned Schedule is not applicable to that link. If either the AP or STA doesn't support multi-link operation or is not affiliated with any multi-link device, then the Aligned Schedule Link ID Bitmap field 1202 in the Broadcast TWT Parameter Set may not be present.

In such embodiments, either the AP MLD or the non-AP MLD can indicate an Aligned Schedule Link ID Bitmap through the Broadcast TWT Parameter Set in the corresponding Broadcast TWT element. For example, the AP MLD may indicate it with an Accept TWT, Alternate TWT, or Dictate TWT, and the non-AP MLD may indicate it with a Request TWT, Suggest TWT, or Demand TWT.

In some embodiments, a Broadcast TWT ID in the Broadcast TWT Info subfield in the Broadcast TWT Parameter Set field can be set to the same value for the Aligned Schedules established across multiple links between an AP MLD and a non-AP MLD.

In some embodiments, if a broadcast TWT schedule is established on any link between an AP MLD and a non-AP MLD, and if that link is disabled through TID-to-Link mapping, then the broadcast TWT schedule established on that link is torn down.

In some embodiments, for the scenario in which an Aligned Schedule is established across multiple links between an AP MLD and a non-AP MLD, if one or more of the links on which the Aligned Schedule has been established are disabled by the AP MLD or the non-AP MLD through TID-to-Link mapping, the broadcast TWT schedules corresponding to the Aligned Schedule on the remaining links are still maintained. In other embodiments, if one or more of the links on which the Aligned Schedule has been established are disabled by the AP MLD or the non-AP MLD through TID-to-Link mapping, the broadcast TWT schedules corresponding to the Aligned Schedule on the remaining links are also torn down.

In some embodiments, if a broadcast TWT schedule is established on any link between an AP MLD and a non-AP MLD, and if that link is deleted by the AP MLD, then the broadcast TWT schedule established on that link is torn down.

In some embodiments, for the scenario in which an Aligned Schedule is established across multiple links between an AP MLD and a non-AP MLD, if one or more of the links on which the Aligned Schedule has been established are deleted by the AP MLD, the broadcast TWT schedules corresponding to the Aligned Schedule on the remaining links are still maintained. In other embodiments, if one or more of the links on which the Aligned Schedule has been established are deleted by the AP MLD, the broadcast TWT schedules corresponding to the Aligned Schedule on the remaining links are also torn down.

FIG. 13 illustrates another example of a Broadcast TWT Parameter Set field format according to various embodiments of the present disclosure. As discussed above, the Broadcast TWT Link ID Bitmap subfield 1302, if present, specifies a bitmap indicating the links between an AP MLD and a non-AP MLD for which the corresponding broadcast TWT schedule is being negotiated. A value of 1 in the $k^{th}$ bit position in the Broadcast TWT Link ID Bitmap subfield 1302 indicates that the negotiation for the TWT schedule applies for the $k^{th}$ link between the AP MLD and non-AP MLD. A value set to 0 in the $k^{th}$ bit position in the Broadcast TWT Link ID Bitmap subfield 1302 indicates that the negotiation for the TWT schedule does not apply for the $k^{th}$ link between the AP MLD and non-AP MLD.

FIG. 14 illustrates another example of a Request Type field format in a Broadcast TWT Parameter Set field according to various embodiments of the present disclosure. The Broadcast TWT Link ID Bitmap Present subfield 1402 indicates whether or not a Broadcast TWT Link ID Bitmap subfield (e.g., subfield 1302) is present in the corresponding Broadcast TWT Parameter Set field. The Broadcast TWT Link ID Bitmap Present subfield 1402 is set to 1 if the Broadcast TWT Link ID Bitmap subfield is present in the corresponding Broadcast TWT Parameter Set field. Otherwise, it is set to 0.

In some embodiments, the above processes for negotiating membership of a broadcast TWT schedule for MLDs can be described as follows with respect to the IEEE draft standard P802.11ax/D8.0. A TWT scheduling AP affiliated with an AP MLD and a TWT scheduled STA affiliated with a non-AP MLD, for negotiating membership of a broadcast TWT schedule, shall follow the rules defined in 26.8.3.1 (General), 26.8.3.2 (Rules for TWT scheduling AP), and 26.8.3.3 (Rules for TWT scheduled STA) except the following:

The TWT scheduled STA affiliated with the non-AP MLD or the TWT scheduling AP affiliated with the AP MLD, while negotiating for a broadcast TWT schedule, may indicate the link(s) between the AP MLD and the non-AP MLD for which the negotiation is being conducted. The TWT scheduled STA or the TWT scheduling AP transmitting the TWT element may make the link indication in the Broadcast TWT Link ID Bitmap subfield in the Broadcast TWT Parameter Set field corresponding to the broadcast TWT schedule.

If one or more links are indicated in the Broadcast TWT Link ID Bitmap subfield in the Broadcast TWT Parameter Set field transmitted by the TWT scheduled STA affiliated with the non-AP MLD or the TWT scheduling AP affiliated with the AP MLD, the corresponding broadcast TWT schedule is requested on behalf of the STAs affiliated with the same MLD and operating on the indicated links between the AP MLD and the non-AP MLD. The Target Wake Time field in the Broadcast TWT Parameter Set field shall be in reference to the TSF time of the respective links that are indicated in the Broadcast TWT Link ID Bitmap.

A TWT scheduling AP affiliated with an AP MLD that receives a TWT element with Broadcast TWT Link ID Bitmap subfield in a Broadcast TWT Parameter Set field from a TWT scheduled STA affiliated with a non-AP MLD may respond by including Broadcast TWT Link ID Bitmap subfield that indicates the same or different sets of links as that of received Broadcast TWT Link ID Bitmap if the TWT Setup Command field in the Request Type field in the corresponding Broadcast TWT Parameter Set field in the response frame is set to Alternate TWT or Dictate TWT. The TWT scheduling AP shall respond with a Broadcast TWT Link ID Bitmap that indicates the same set of links as that indicated in the received Broadcast TWT Parameter Set field if the TWT Setup Command field in the Request Type field in the corresponding Broadcast TWT Parameter Set field in the response frame is set to Accept TWT or Reject TWT.

For a Broadcast TWT element, if at least one Broadcast TWT Parameter Set field in the Broadcast TWT element contains a Broadcast TWT Link ID Bitmap subfield, the Link ID Bitmap Present subfield in the Control field of the broadcast TWT element is set to 1; otherwise, the Link ID Bitmap Present subfield is set to 0.

Figure 15:
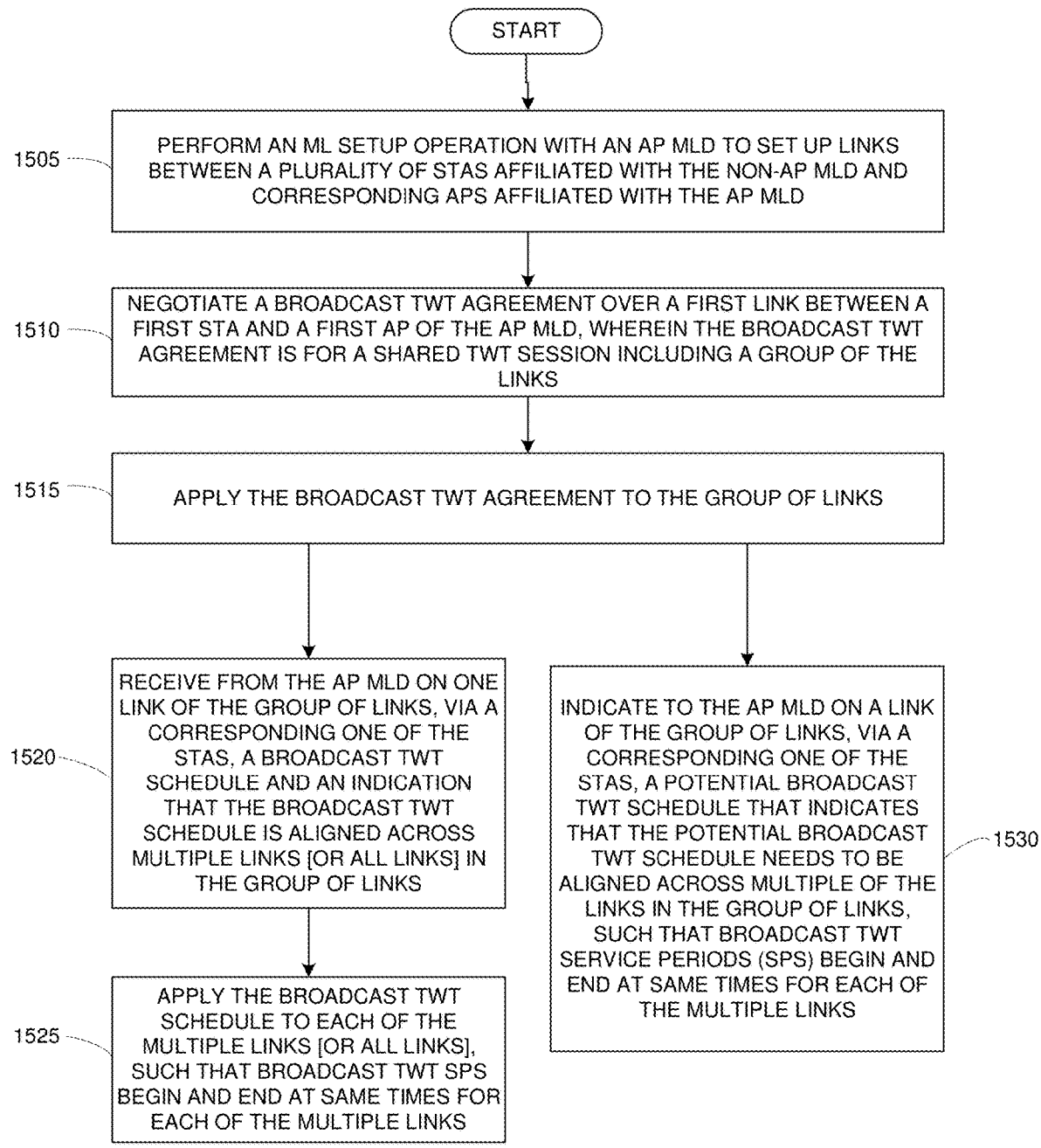
FIG. 15 illustrates an example process for facilitating broadcast TWT operation in a WLAN according to various embodiments of the present disclosure.

FIG. 15 illustrates an example process for facilitating broadcast TWT operation in a WLAN according to various embodiments of the present disclosure. The process of FIG. 15 is discussed as being performed by a non-AP MLD, but it is understood that a corresponding AP MLD performs a corresponding process. Additionally, for convenience, the process of FIG. 15 is discussed as being performed by a WI-FI non-AP MLD, but it is understood that any suitable wireless communication device could perform these processes.

Referring to FIG. 15, the process begins with the non-AP MLD performing an ML setup operation with an AP MLD to set up links between a plurality of STAs affiliated with the non-AP MLD and corresponding APs affiliated with the AP MLD (step 1505). During the ML setup, the non-AP MLD can indicate to the AP MLD that broadcast TWT operation is supported by the non-AP MLD. The link used for ML setup may be used to make this indication.

Next, the non-AP MLD negotiates a broadcast TWT agreement over a first link between a first STA and a first AP of the AP MLD, wherein the broadcast TWT agreement is for a shared TWT session including a group of the links (step 1510). The first link may be referred to as the negotiating link. The negotiating link may be the same link on which the ML setup operation was performed.

During the negotiation of the broadcast TWT agreement at step 1510, the non-AP MLD can indicate to the AP MLD on the first link, via the first STA, the group of links that are to be included in the broadcast TWT agreement. The non-AP MLD can do this by generating a Broadcast TWT Parameter Set that includes a Broadcast TWT Link ID Bitmap subfield, and a subfield indicating whether the Broadcast TWT Link ID Bitmap subfield is present in the Broadcast TWT Parameter Set. A bitmap included in the Broadcast TWT Link ID Bitmap subfield indicates whether each of the links is included in the group of links that are to be included in the broadcast TWT agreement. For example, a bit in the bitmap corresponding to each of the MLO links can be set to 1 to indicate that the link is to be included in the broadcast TWT agreement, or set to 0 if not. The non-AP MLD then transmits the Broadcast TWT Parameter Set to the AP MLD over the first link via the first STA.

After the broadcast TWT agreement is successfully negotiated, the non-AP MLD then applies the broadcast TWT agreement to the group of links (step 1515). For example, one set of broadcast TWT parameters negotiated during the agreement can be applied to each link in the group of links.

During broadcast TWT operation, the non-AP MLD receives from the AP MLD on at least one link of the group of links, via the at least one corresponding STA, a broadcast TWT schedule and an indication that the broadcast TWT schedule is aligned across multiple links in the group of links (step 1520). The non-AP MLD then applies the broadcast TWT schedule to each of the multiple links, such that broadcast TWT SPs begin and end at same times for each of the multiple links (step 1525).

In some embodiments, the aligned broadcast TWT schedule is applied only to the links on which it is received. In other embodiments, the aligned broadcast TWT schedule is received only on one of the links, and is applied to all of the group of links participating in the broadcast TWT operation.

As an alternative to steps 1520 and 1525, the non-AP MLD can indicate to the AP MLD on a link of the group of links, via a corresponding one of the STAs, a potential broadcast TWT schedule that indicates that the potential broadcast TWT schedule needs to be aligned across multiple of the links in the group of links, such that broadcast TWT SPs begin and end at same times for each of the multiple links (step 1530).

The above flowchart illustrates an example method that can be implemented in accordance with the principles of the present disclosure and various changes could be made to the method illustrated in the flowchart. For example, while shown as a series of steps, various steps could overlap, occur in parallel, occur in a different order, or occur multiple times. In another example, steps may be omitted or replaced by other steps.

According to one embodiment, if multiple broadcast TWT schedules are established over multiple links between an AP MLD and a non-AP MLD, then the non-AP MLD may receive, over any of the links between the AP MLD and the non-AP MLD, TWT parameters from the AP MLD corresponding to any of those TWT schedules established on any of the links between the AP MLD and the non-AP MLD.

According to one embodiment, if multiple broadcast TWT schedules are established over multiple links between an AP MLD and a non-AP MLD, then the AP MLD may receive, over any of the links between the AP MLD and the non-AP MLD, TWT parameters from the non-AP MLD corresponding to any of those TWT schedules established on any of the links between the AP MLD and the non-AP MLD.

According to one embodiment, if multiple broadcast TWT schedules are established over multiple links between an AP MLD and a non-AP MLD, then the non-AP MLD may choose not to decode a Beacon frame, Probe Response frame, or other group-addressed frame carrying TWT information pertaining to any TWT schedule established over any link between the AP MLD and the non-AP MLD, on some of the links between the AP MLD and the non-AP MLD.

According to one embodiment, if multiple broadcast TWT schedules are established over multiple links between an AP MLD and a non-AP MLD, then the non-AP MLD may negotiate with the AP MLD one or multiple links on which the non-AP MLD intends to receive and decode the Beacon frame, Probe Response frame, or other group addressed frame carrying TWT information pertaining to any TWT schedule established over any link between the AP MLD and the non-AP MLD.

According to one embodiment, if multiple broadcast TWT schedules are established over multiple links between an AP MLD and a non-AP MLD, and if the non-AP MLD negotiates with the AP MLD that the non-AP MLD will not receive any TWT parameter change related frame (e.g., beacon frame, TWT Setup frame, etc.) on a particular link (e.g., the first link) between the AP MLD and the non-AP, then the AP MLD will make sure that the non-AP MLD receives the notification of any upcoming change related to a TWT schedule or TWT agreement (e.g., Alternate TWT, Reject TWT, etc.) on the first link before the change in the TWT schedule or TWT agreement takes place on the first link. According to one embodiment, the AP MLD can do this by selecting the appropriate values in the Broadcast TWT Persistence subfield in the TWT element corresponding to that upcoming change related to the TWT schedule or TWT agreement on the first link and sending the corresponding TWT element on another link between the same AP MLD and the non-AP MLD.

According to one embodiment, if a non-AP MLD is operating in an Enhanced Multi-Link Single Radio (EMLSR) mode, it can have a TWT schedule or TWT agreement over only a single link among the EMLSR links.

According to one embodiment, if a non-AP MLD has established multiple TWT schedules or TWT agreements over multiple links between the non-AP MLD and its associated AP MLD, then the non-AP MLD does not operate or transition into the EMLSR mode.

According to one embodiment, if a non-AP MLD is operating in an Enhanced Multi-Link Multi Radio (EMLMR) mode, it can have a TWT schedule or TWT agreement over only a single link between the AP MLD and the non-AP MLD.

According to one embodiment, if a non-AP MLD has established multiple TWT schedules or TWT agreements over multiple links between the non-AP MLD and its associated AP MLD, then the non-AP MLD does not operate or transition into the EMLMR mode.

According to one embodiment, if a non-AP MLD has a non-simultaneous transmit and receive (NSTR) link pair, it can have a TWT schedule or TWT agreement over only a single link of the two links forming the NSTR link pair.

According to one embodiment, the format of the Broadcast TWT Parameter Set field in a broadcast TWT element can be the example format illustrated in FIG. 16. The Broadcast TWT Enhanced Info subfield 1602, if present, specifies additional information about the broadcast TWT schedule. The format of the Broadcast TWT Enhanced Info subfield 1602 is illustrated in FIG. 17.

According to one embodiment, in the example of FIG. 17, the Broadcast TWT Link ID Bitmap subfield 1702 specifies a bitmap indicating the links between an AP MLD and a non-AP MLD for which the corresponding broadcast TWT schedule is being negotiated. A value of 1 in the $k^{th}$ bit position in the Broadcast TWT Link ID Bitmap subfield 1702 indicates that the negotiation for the TWT schedule applies for the $k^{th}$ link between the AP MLD and non-AP MLD. A value set to 0 in the $k^{th}$ bit position in the Broadcast TWT Link ID Bitmap subfield 1702 indicates that the negotiation for the TWT schedule does not apply for the $k^{th}$ link between the AP MLD and non-AP MLD.

According to one embodiment, the Request Type field format in a Broadcast TWT Parameter Set field is illustrated in FIG. 18. The Broadcast TWT Enhanced Info Present subfield 1802 in FIG. 18 indicates whether or not a Broadcast TWT Enhanced Info subfield is present in the corresponding Broadcast TWT Parameter Set field. The Broadcast TWT Enhanced Info Present subfield 1802 is set to 1 if Broadcast TWT Enhanced Info subfield is present in the corresponding Broadcast TWT Parameter Set field. Otherwise, it is set to 0. This subfield is set to 0 when the corresponding Broadcast TWT Parameter Set field is carried in a TWT element with Negotiation Type subfield set to 2.

According to one embodiment, a TWT scheduling AP affiliated with an AP MLD and a TWT scheduled STA affiliated with a non-AP MLD, for negotiating membership of a broadcast TWT schedule, shall follow the rules defined in current spec and the following additional rules:

The TWT scheduled STA affiliated with the non-AP MLD or the TWT scheduling AP affiliated with the AP MLD, while negotiating for a broadcast TWT schedule, may indicate the link or links between the AP MLD and the non-AP MLD for which the negotiation is being conducted. The TWT scheduled STA or the TWT scheduling AP transmitting the TWT element may make the link indication in the Broadcast TWT Link ID Bitmap subfield in the Broadcast TWT Parameter Set field corresponding to the broadcast TWT schedule.

If one or more links are indicated in the Broadcast TWT Link ID Bitmap subfield in the Broadcast TWT Parameter Set field transmitted by the TWT scheduled STA affiliated with the non-AP MLD or the TWT scheduling AP affiliated with the AP MLD, the corresponding broadcast TWT schedule is negotiated on behalf of the STAs affiliated with the same MLD and operating on the indicated links between the AP MLD and the non-AP MLD. The Target Wake Time field in the Broadcast TWT Parameter Set field shall be in reference to the TSF time of the respective links that are indicated in the Broadcast TWT Link ID Bitmap.

A TWT scheduling AP affiliated with an AP MLD that receives a TWT element with Broadcast TWT Link ID Bitmap subfield in a Broadcast TWT Parameter Set field from a TWT scheduled STA affiliated with a non-AP MLD may respond by including a Broadcast TWT Link ID Bitmap subfield that indicates a different set of links from that of the received Broadcast TWT Link ID Bitmap or the same set of links as that of the received Broadcast TWT Link ID Bitmap but with different TWT parameters if the TWT Setup Command field in the Request Type field in the corresponding Broadcast TWT Parameter Set field in the response frame is set to Alternate TWT or Dictate TWT. The TWT scheduling AP shall respond with a Broadcast TWT Link ID Bitmap that indicates the same set of links and the same TWT parameters as that indicated in the received Broadcast TWT Parameter Set field if the TWT Setup Command field in the Request Type field in the corresponding Broadcast TWT Parameter Set field in the response frame is set to Accept TWT or Reject TWT.

According to one embodiment, if a TWT scheduling AP affiliated with an AP MLD or a TWT scheduled STA affiliated with a non-AP MLD transmits a broadcast TWT element that contains a Broadcast TWT Link ID Bitmap subfield in at least one of the Broadcast TWT Parameter Set fields, then the TWT scheduling AP or the TWT scheduled STA shall set the Link ID Bitmap Present subfield in the Control field of the broadcast TWT element to 1. Otherwise, the TWT scheduling AP or the TWT scheduled STA shall set the Link ID Bitmap Present subfield to 0.

According to one embodiment, for restricted TWT (r-TWT) operation between an AP MLD and a non-AP MLD, the AP MLD or the non-AP MLD shall not transmit a TWT element over any of the links between them that sets the $k^{th}$ bit in the Restricted TWT DL TID Bitmap subfield or Restricted TWT UL TID Bitmap subfield, if present, to 1 if the TID k is not mapped, through TID-to-Link mapping, on the desired link for which the restricted TWT schedule is being negotiated. Moreover, the AP MLD or the non-AP MLD shall not transmit a TWT element over any of the links between them that sets the DL TID Bitmap Valid subfield or UL TID Bitmap Valid subfield, if present, to 1 if any of the TIDs is not mapped on the desired link.

Figure 19:
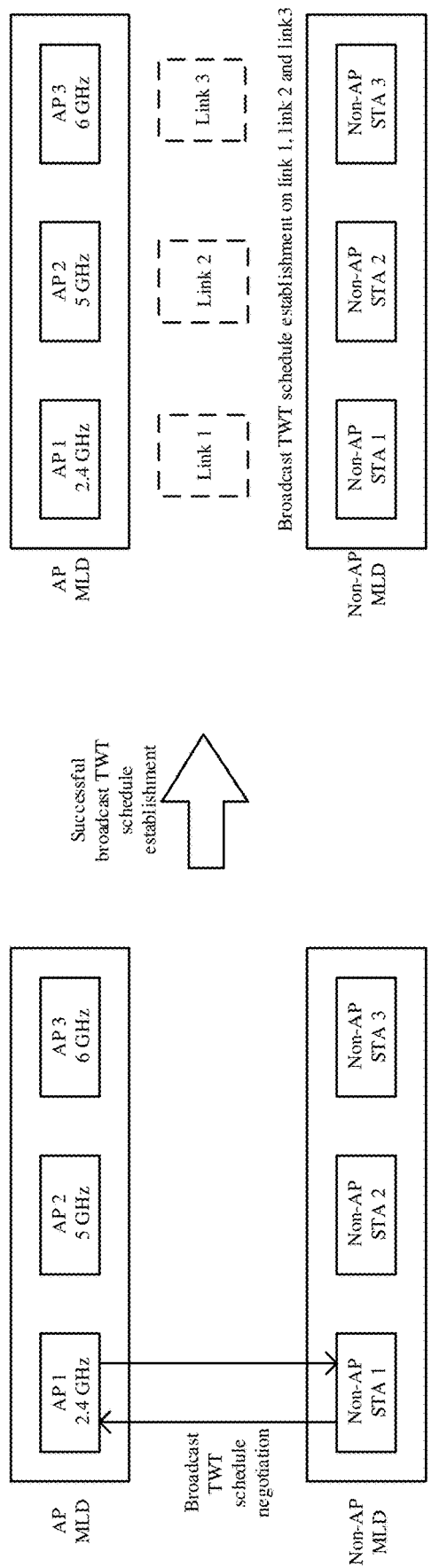
FIG. 19 illustrates an example of operation for negotiating a broadcast TWT schedule between an AP MLD and a non-AP MLD according to various embodiments of the present disclosure.

FIG. 19 illustrates an example of operation for negotiating a broadcast TWT schedule between an AP MLD and a non-AP MLD according to various embodiments of the present disclosure. In general, an AP affiliated with an AP MLD and an STA affiliated with a non-AP MLD should be able to negotiate a broadcast TWT schedule over one link between the AP MLD and the non-AP MLD on behalf of multiple links between the same AP MLD and the non-AP MLD. The following example can be helpful in illustrating this process.

In the example of FIG. 19, an AP MLD has three affiliated APs: AP 1 operates on 2.4 GHz band, AP 2 operates on 5 GHz band, and AP 3 operates on 6 GHz band. A non-AP MLD has three affiliated STAs: STA 1 operates on 2.4 GHz band, STA 2 operates on 5 GHz band, and STA 3 operates on 6 GHz band. Three links are set up and enabled between the AP MLD and the non-AP MLD: Link 1 between AP 1 and STA 1; Link 2 between AP 2 and STA 2; Link 3 between AP 3 and STA 3. The AP MLD advertises a broadcast TWT schedule, namely Schedule A, over all three links. Non-AP STA 1 affiliated with the non-AP MLD sends a broadcast TWT element to AP 1 affiliated with the AP MLD. The broadcast TWT element contains a Broadcast TWT Parameter Set field corresponding to Schedule A. Also, the Broadcast TWT Parameter Set field sent by non-AP STA 1 indicates the three links, Link 1, Link 2, and Link 3, and sets the TWT Setup Command field as Request TWT. Upon receiving the TWT element, AP 1 sends a TWT element to non-AP STA 1 and includes the Broadcast TWT Parameter Set field corresponding to Schedule A. AP 1, in this Broadcast TWT Parameter Set field, also indicates the same three links, Link 1, Link 2, and Link 3, and sets the TWT Setup Command field as Accept TWT. After the successful broadcast TWT negotiation, Schedule A is established over all the three links: Link 1, Link 2, and Link 3.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A non-access point (AP) multi-link device (MLD) comprising:
a plurality of stations (STAs) that each comprise a transceiver configured to transmit and receive signals; and
a processor operably coupled to the transceivers, the processor configured to:
perform a multi-link (ML) setup operation with an AP MLD to set up links between the STAs affiliated with the non-AP MLD and corresponding APs affiliated with the AP MLD;
negotiate a broadcast target wake time (TWT) agreement over a first link between a first STA and a first AP of the AP MLD, wherein the broadcast TWT agreement is for a shared TWT session including a group of the links; and
after the broadcast TWT agreement is successfully negotiated, apply the broadcast TWT agreement to the group of links.

2. The non-AP MLD of claim 1, wherein the processor is further configured to indicate to the AP MLD on the first link, via the first STA during the ML setup operation, that broadcast TWT operation is supported by the non-AP MLD.

3. The non-AP MLD of claim 1, wherein the processor is further configured to indicate to the AP MLD on the first link, via the first STA during the negotiation of the broadcast TWT agreement, the group of links that are to be included in the broadcast TWT agreement.

4. The non-AP MLD of claim 1, wherein the processor is further configured to:
generate a broadcast TWT parameter set that includes a broadcast TWT link identifier (ID) bitmap subfield, and a subfield indicating whether the broadcast TWT link ID bitmap subfield is present in the broadcast TWT parameter set, wherein a bitmap included in the broadcast TWT link ID bitmap subfield indicates whether each of the links is included in the group of links that are to be included in the broadcast TWT agreement; and
transmit the broadcast TWT parameter set to the AP MLD over the first link via the first STA during the negotiation of the broadcast TWT agreement.

5. The non-AP MLD of claim 1, wherein the processor is further configured to:
receive from the AP MLD on one link of the group of links, via a corresponding one of the STAs, a broadcast TWT schedule and an indication that the broadcast TWT schedule is aligned across multiple links in the group of links; and
apply the broadcast TWT schedule to each of the multiple links, such that broadcast TWT service periods (SPs) begin and end at same times for each of the multiple links.

6. The non-AP MLD of claim 1, wherein the processor is further configured to:
receive from the AP MLD on at least one link of the group of links, via a corresponding at least one STA of the STAs, a broadcast TWT schedule and an indication that the broadcast TWT schedule is an aligned broadcast TWT schedule; and
apply the aligned broadcast TWT schedule to each of the at least one link on which the broadcast TWT schedule was received, such that broadcast TWT service periods (SPs) begin and end at same times for each of the at least one link.

7. The non-AP MLD of claim 1, wherein the processor is configured to indicate to the AP MLD on a link of the group of links, via a corresponding one of the STAs, a potential broadcast TWT schedule that indicates that the potential broadcast TWT schedule needs to be aligned across multiple of the links in the group of links, such that broadcast TWT service periods (SPs) begin and end at same times for each of the multiple links.

8. An access point (AP) multi-link device (MLD) comprising:
a plurality of APs that each comprise a transceiver configured to transmit and receive signals; and
a processor operably coupled to the transceivers, the processor configured to:
perform a multi-link (ML) setup operation with a non-AP MLD to set up links between the APs affiliated with the AP MLD and corresponding stations (STAs) affiliated with the non-AP MLD;
negotiate a broadcast target wake time (TWT) agreement over a first link between a first AP and a first STA of the non-AP MLD, wherein the broadcast TWT agreement is for a shared TWT session including a group of the links; and
after the broadcast TWT agreement is successfully negotiated, apply the broadcast TWT agreement to the group of links.

9. The AP MLD of claim 8, wherein the processor is further configured to receive an indication from the non-AP MLD on the first link, via the first AP during the ML setup operation, that broadcast TWT operation is supported by the non-AP MLD.

10. The AP MLD of claim 8, wherein the processor is further configured to receive an indication from the non-AP MLD on the first link, via the first AP during the negotiation of the broadcast TWT agreement, of the group of links that are to be included in the broadcast TWT agreement.

11. The AP MLD of claim 8, wherein the processor is further configured to receive a broadcast TWT parameter set from the non-AP MLD over the first link via the first AP during the negotiation of the broadcast TWT agreement,
wherein the broadcast TWT parameter set includes a broadcast TWT link identifier (ID) bitmap subfield, and a subfield indicating whether the broadcast TWT link ID bitmap subfield is present in the broadcast TWT parameter set, and
wherein a bitmap included in the broadcast TWT link ID bitmap subfield indicates whether each of the links is included in the group of links that are to be included in the broadcast TWT agreement.

12. The AP MLD of claim 8, wherein the processor is further configured to:
generate a broadcast TWT schedule and an indication that the broadcast TWT schedule is aligned across multiple links in the group of links;
transmit to the non-AP MLD on one link of the group of links, via a corresponding one of the APs, the broadcast TWT schedule and the indication; and
apply the broadcast TWT schedule to each of the multiple links, such that broadcast TWT service periods (SPs) begin and end at same times for each of the multiple links.

13. The AP MLD of claim 8, wherein the processor is further configured to:
transmit to the non-AP MLD on at least one link of the group of links, via a corresponding at least one AP of the APs, a broadcast TWT schedule and an indication that the broadcast TWT schedule is an aligned broadcast TWT schedule; and
apply the aligned broadcast TWT schedule to each of the at least one link on which the broadcast TWT schedule was transmitted, such that broadcast TWT service periods (SPs) begin and end at same times for each of the at least one link.

14. The AP MLD of claim 8, wherein the processor is further configured to receive an indication from the non-AP MLD on a link of the group of links, via a corresponding one of the APs, of a potential broadcast TWT schedule that indicates that the potential broadcast TWT schedule needs to be aligned across multiple of the links in the group of links, such that broadcast TWT service periods (SPs) begin and end at same times for each of the multiple links.

15. A method for facilitating broadcast target wake time (TWT) operation by a non-access point (AP) multi-link device (MLD), the method comprising:
performing a multi-link (ML) setup operation with an AP MLD to set up links between a plurality of stations (STAs) affiliated with the non-AP MLD and corresponding APs affiliated with the AP MLD;
negotiating a broadcast TWT agreement over a first link between a first STA and a first AP of the AP MLD, wherein the broadcast TWT agreement is for a shared TWT session including a group of the links; and
after the broadcast TWT agreement is successfully negotiated, applying the broadcast TWT agreement to the group of links.

16. The method of claim 15, further comprising indicating to the AP MLD on the first link, via the first STA during the ML setup operation, that broadcast TWT operation is supported by the non-AP MLD.

17. The method of claim 15, further comprising:
generating a broadcast TWT parameter set that includes a broadcast TWT link identifier (ID) bitmap subfield, and a subfield indicating whether the broadcast TWT link ID bitmap subfield is present in the broadcast TWT parameter set, wherein a bitmap included in the broadcast TWT link ID bitmap subfield indicates whether each of the links is included in the group of links that are to be included in the broadcast TWT agreement; and
transmitting the broadcast TWT parameter set to the AP MLD over the first link via the first STA during the negotiation of the broadcast TWT agreement.

18. The method of claim 15, further comprising:
receiving from the AP MLD on one link of the group of links, via a corresponding one of the STAs, a broadcast TWT schedule and an indication that the broadcast TWT schedule is aligned across multiple links in the group of links; and
applying the broadcast TWT schedule to each of the multiple links, such that broadcast TWT service periods (SPs) begin and end at same times for each of the multiple links.

19. The method of claim 15, further comprising:
receiving from the AP MLD on at least one link of the group of links, via a corresponding at least one STA of the STAs, a broadcast TWT schedule and an indication that the broadcast TWT schedule is an aligned broadcast TWT schedule; and
applying the aligned broadcast TWT schedule to each of the at least one link on which the broadcast TWT schedule was received, such that broadcast TWT service periods (SPs) begin and end at same times for each of the at least one link.

20. The method of claim 15, further comprising indicating to the AP MLD on a link of the group of links, via a corresponding one of the STAs, a potential broadcast TWT schedule that indicates that the potential broadcast TWT schedule needs to be aligned across multiple of the links in the group of links, such that broadcast TWT service periods (SPs) begin and end at same times for each of the multiple links.

* * * * *